United States Patent
Modi et al.

(10) Patent No.: US 10,819,637 B2
(45) Date of Patent: Oct. 27, 2020

(54) DETERMINATION AND INDICATION OF NETWORK TRAFFIC CONGESTION

(71) Applicant: Cisco Technology, Inc., San Jose, CA (US)

(72) Inventors: Vaibhav Modi, Cedar Park, TX (US); Kishore Karighattam, Austin, TX (US); Sangeeta Panigrahy, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 193 days.

(21) Appl. No.: 15/672,333

(22) Filed: Aug. 9, 2017

(65) Prior Publication Data
US 2019/0052565 A1   Feb. 14, 2019

(51) Int. Cl.
*H04L 12/801* (2013.01)
*H04L 12/26* (2006.01)
*H04L 12/841* (2013.01)

(52) U.S. Cl.
CPC .......... *H04L 47/11* (2013.01); *H04L 43/0852* (2013.01); *H04L 47/283* (2013.01); *H04L 43/16* (2013.01); *H04L 47/12* (2013.01)

(58) Field of Classification Search
USPC ....................................................... 709/224
See application file for complete search history.

(56) References Cited

U.S. PATENT DOCUMENTS

| | | | |
|---|---|---|---|
| 6,687,750 B1 | 2/2004 | Messinger et al. | |
| 7,849,408 B1 | 12/2010 | Messinger et al. | |
| 8,850,324 B2 | 9/2014 | Clemm et al. | |
| 9,762,610 B1* | 9/2017 | Kwan | H04L 63/1458 |
| 2008/0049631 A1* | 2/2008 | Morrill | H04L 41/5009 370/250 |
| 2012/0106365 A1* | 5/2012 | Terry | H04L 41/5009 370/252 |
| 2014/0250153 A1 | 9/2014 | Nixon et al. | |
| 2016/0219065 A1 | 7/2016 | Dasgupta et al. | |
| 2016/0277272 A1* | 9/2016 | Peach | H04L 43/106 |

(Continued)

OTHER PUBLICATIONS

Goodall, John R. et al.; Preserving the Big Picture: Visual Network Traffic Analysis With TNV (2005).

*Primary Examiner* — Mohamed A. Wasel
*Assistant Examiner* — Marshall M McLeod
(74) *Attorney, Agent, or Firm* — Behmke Innovation Group LLC; James M. Behmke; Jonathon P. Western

(57) ABSTRACT

In one embodiment, a system comprising memory and processor(s), the processor(s) at least adapted to compute representative latency value(s) for a network device, based on a plurality of latency values obtained for a plurality of packets which passed through the network device over a period of time, the plurality of latency values indicative of latency between ingress to and egress from the network device, obtain latency value(s) for packet(s) which passed through the network device after the period of time, the latency value(s) indicative of latency between ingress to and egress from the network device, determine a determination of congestion level(s) for the network device, including analyzing at least one of the latency value(s) in relation to at least one of the representative latency value(s), and generate an indication in accordance with the determination, the indication to be outputted on at least one output device.

14 Claims, 12 Drawing Sheets

(56) References Cited

U.S. PATENT DOCUMENTS

| | | |
|---|---|---|
| 2016/0352766 A1 | 12/2016 | Flacher et al. |
| 2016/0359592 A1 | 12/2016 | Kulshreshtha et al. |
| 2016/0359677 A1 | 12/2016 | Kulshreshtha et al. |
| 2017/0302554 A1* | 10/2017 | Chandrasekaran .......................... H04L 43/0882 |

* cited by examiner

Table 1: Latency Table for Switch 1
Representative latency = 10 microsec

| Ingress port | Egress port | Latency μs | | Congestion factor | |
|---|---|---|---|---|---|
| 1 | 2 | 8 | 422 | ○ | 412 |
| 1 | 3 | 40 | 424 | ● | 414 |
| 2 | 3 | 9 | 426 | ○ | 416 |
| 4 | 3 | 10 | 428 | ○ | 418 |

Table 2: Latency Table for Switch 2
Representative latency = 15 microsec

| Ingress port | Egress port | Latency μs | | Congestion factor | |
|---|---|---|---|---|---|
| 2 | 1 | 15 | 462 | ○ | 472 |
| 3 | 1 | 14 | 464 | ○ | 474 |
| 4 | 1 | 12 | 466 | ○ | 476 |
| 4 | 3 | 10 | 468 | ○ | 478 |

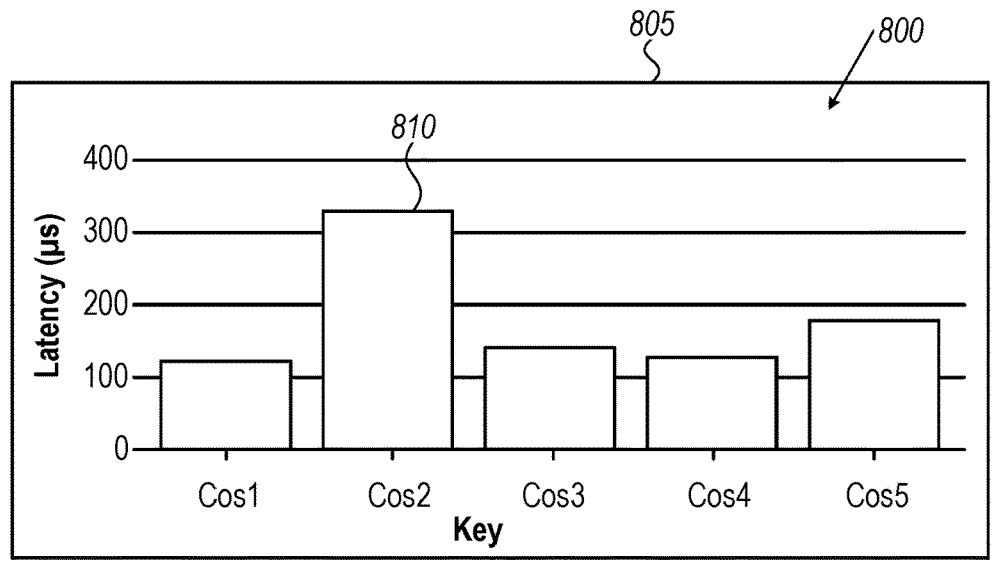
FIG. 8
FIG. 9
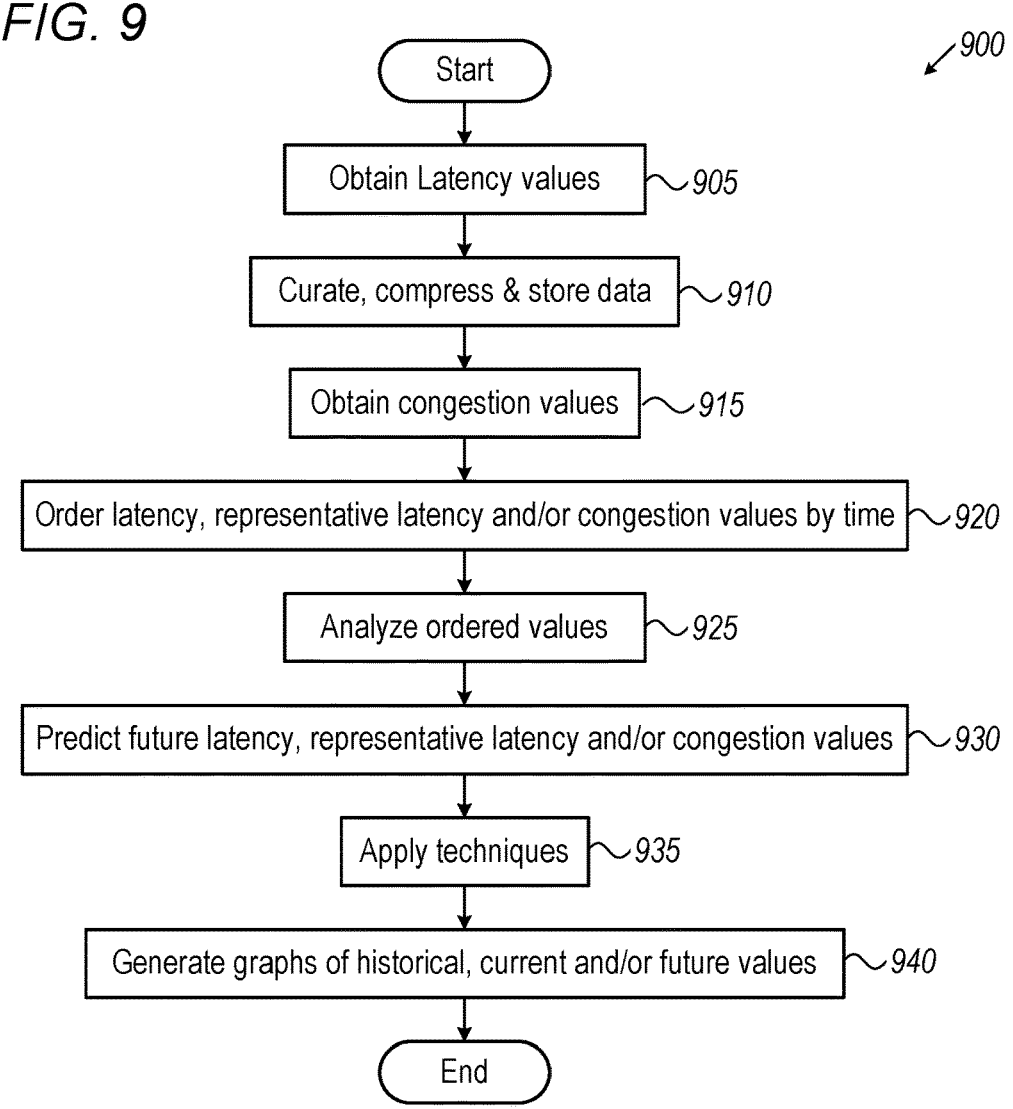

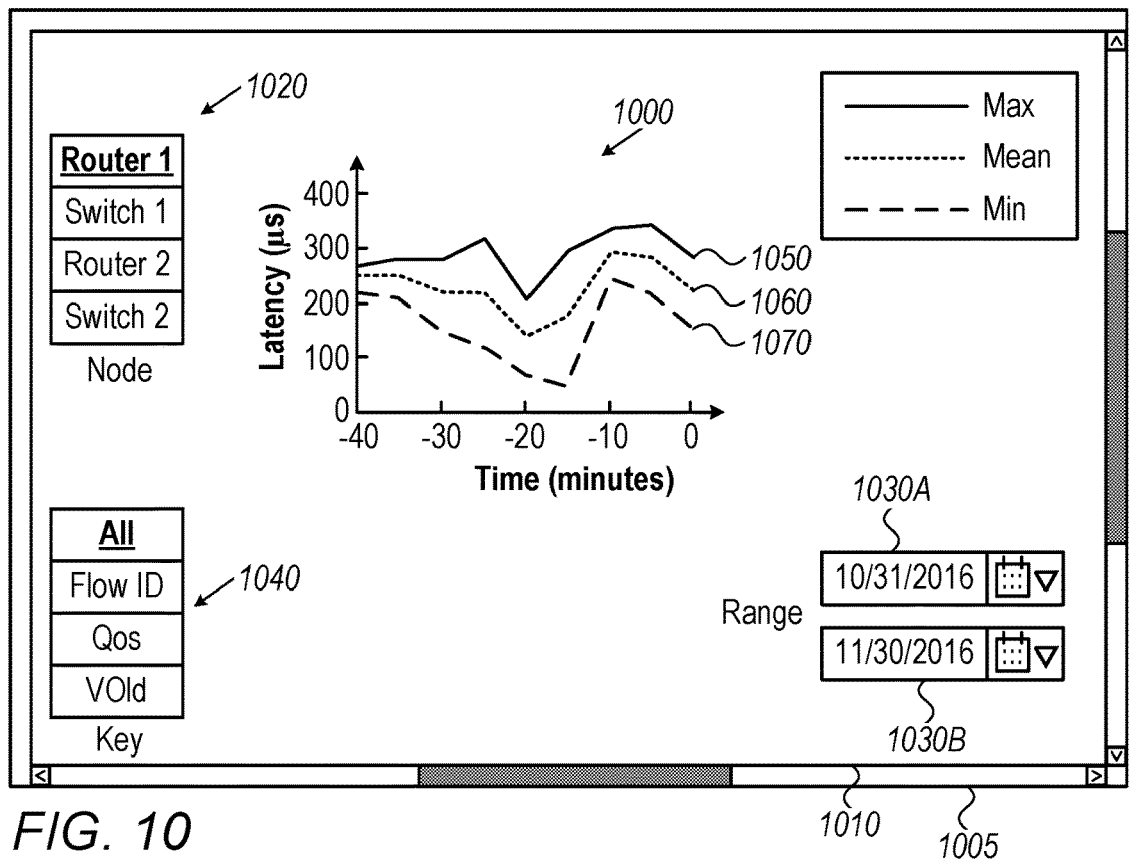
FIG. 10
FIG. 11
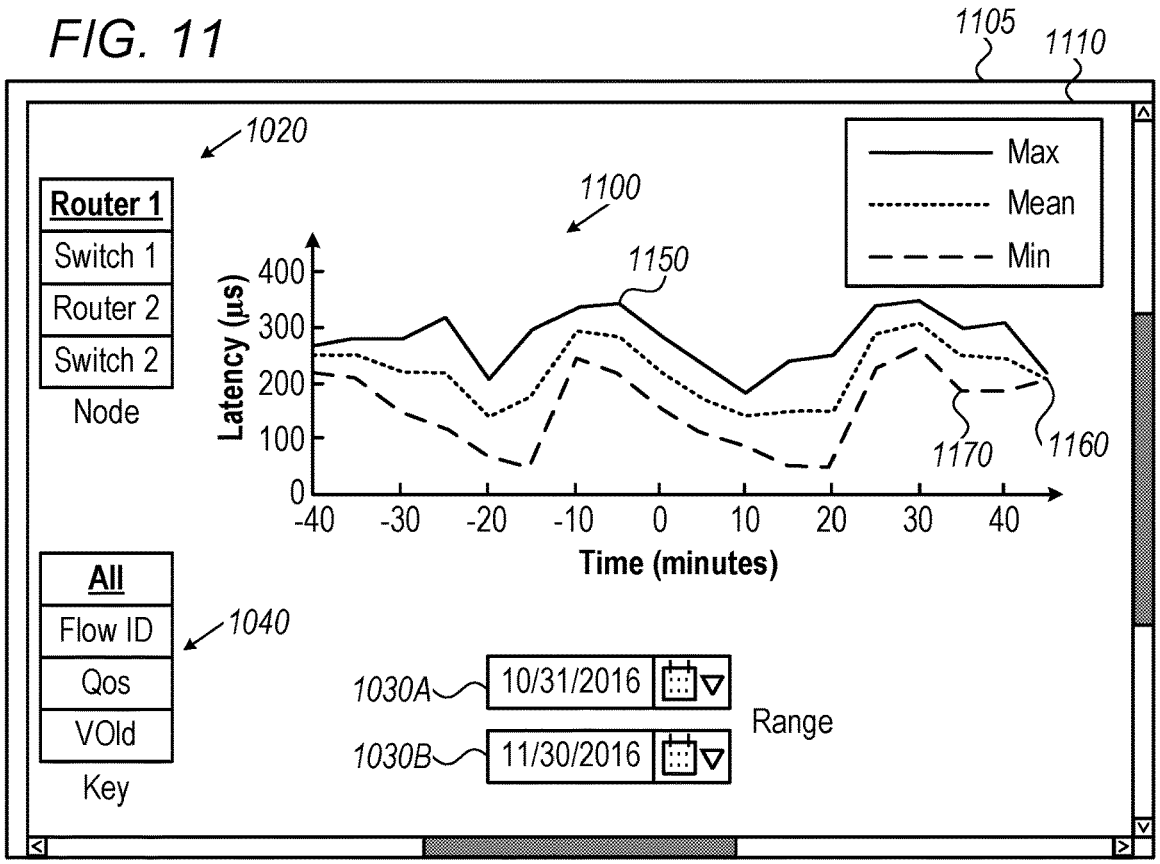

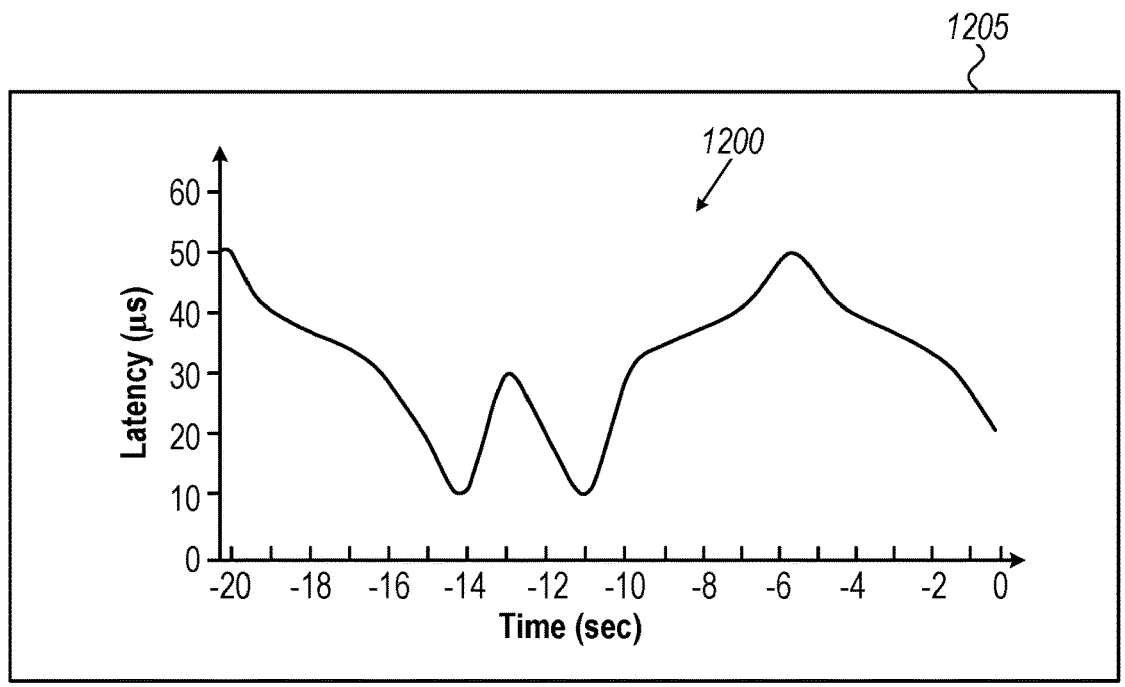
FIG. 12
FIG. 13
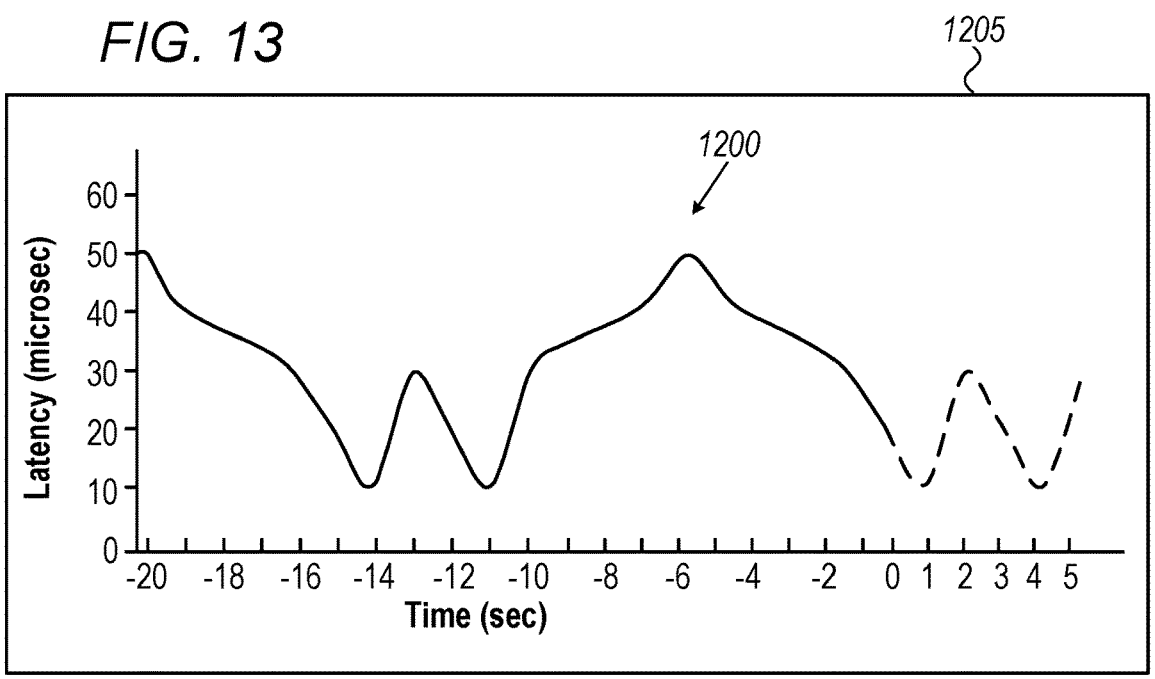

DETERMINATION AND INDICATION OF NETWORK TRAFFIC CONGESTION

TECHNICAL FIELD

The present disclosure generally relates to network service provisioning and/or network administration.

BACKGROUND

A network administrator (also referred to as an Operational Technology "OT" or Information Technology "IT" administrator) of a particular network may be responsible for the network operating properly, including, for example, configuring the network, maintaining the network and/or repairing the network when necessary. A network administrator, may for example, be associated with one or more entities (e.g. individual(s), company/ies, organization(s), etc.) which own and/or operate the particular network.

Usage of a particular network is not necessarily limited to entity/ies which operate and/or own the network. For example, access to the network may be provided to a customer entity by a service provider, e.g. in accordance with a service level agreement (SLA) specifying commitments by the service provider to the customer with respect to the network such as a certain data rate.

BRIEF DESCRIPTION OF THE DRAWINGS

So that the present disclosure may be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

FIG. 8 illustrates a bar graph, in accordance with some embodiments of the presently disclosed subject matter;

FIG. 9 is another flowchart of a method, in accordance with some embodiments of the presently disclosed subject matter;

FIG. 10 illustrates another graphical user interface presented on a display, in accordance with some embodiments of the presently disclosed subject matter;

FIG. 11 illustrates another graphical user interface presented on a display, in accordance with some embodiments of the presently disclosed subject matter;

FIG. 12 illustrates a graph of latency values plotted against time, in accordance with some embodiments of the presently disclosed subject matter;

FIG. 13 illustrates another graph of latency values plotted against time, in accordance with some embodiments of the presently disclosed subject matter;

Figure 1:
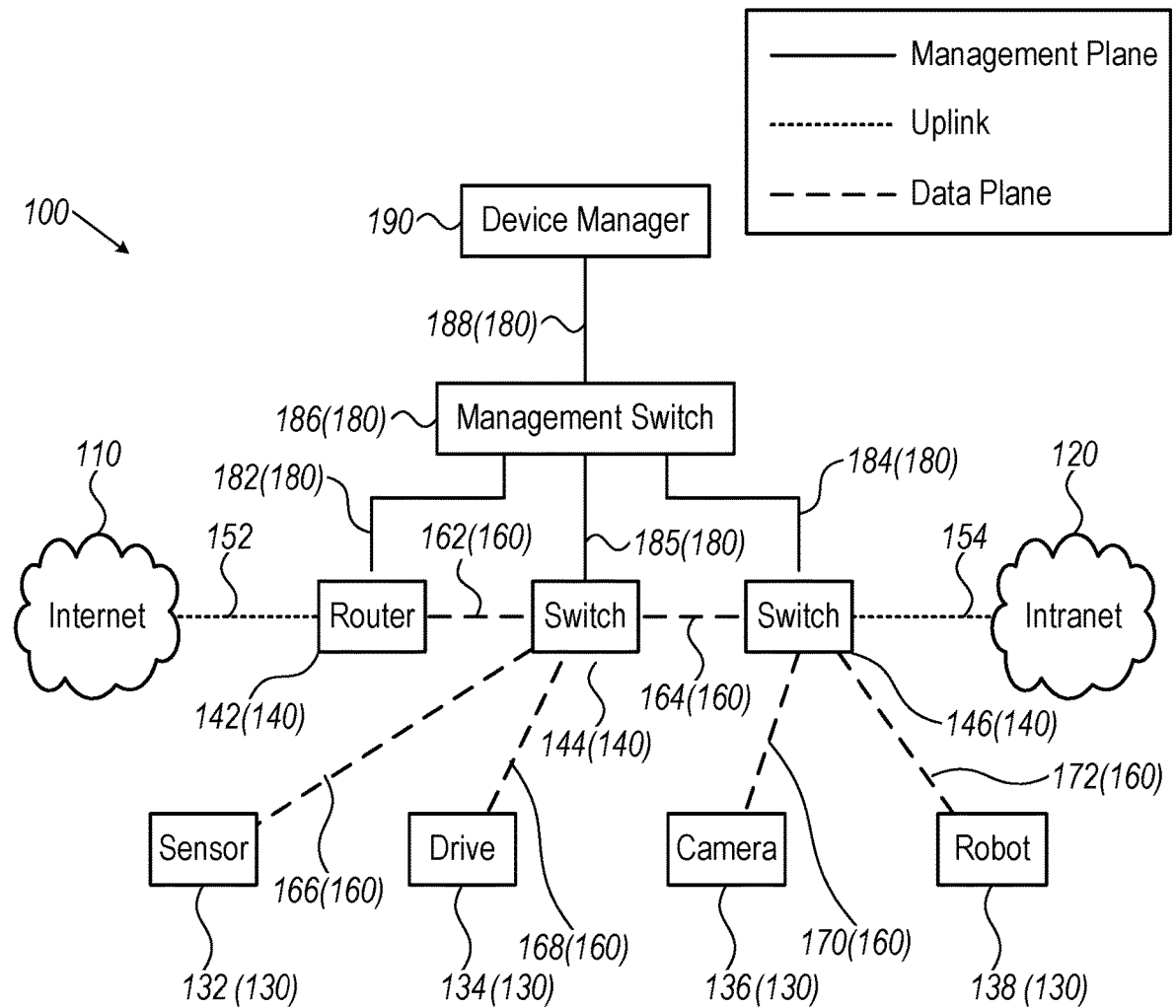
FIG. 1 illustrates a topology of a network, in accordance with some embodiments of the presently disclosed subject matter.

In accordance with common practice the various features illustrated in the drawings may not be drawn to scale. Accordingly, the dimensions of the various features may be arbitrarily expanded or reduced for clarity. In addition, some of the drawings may not depict all of the elements, modules, stages, etc. of a given network, system, method, etc.

DESCRIPTION OF EXAMPLE EMBODIMENTS

Overview

There is provided, in accordance with some embodiments of the presently disclosed subject matter, a system comprising memory and at least one processor, the at least one processor at least adapted to compute one or more representative latency values for a network device, based on a plurality of latency values obtained for a plurality of packets which passed through the network device over a period of time, the plurality of latency values indicative of latency between ingress to the network device and egress from the network device, obtain one or more latency values for one or more packets which passed through the network device after the period of time, the one or more latency values indicative of latency between ingress to the network device and egress from the network device, determine a determination of one or more congestion levels for the network device, including analyzing at least one of the one or more latency values in relation to at least one of the one or more representative latency values, and generate an indication in accordance with the determination, the indication to be outputted on at least one output device.

DETAILED DESCRIPTION OF EXAMPLE EMBODIMENTS

Network latency (also referred to as "latency") is the time taken to travel from one point in a network to another point. The degree of accuracy for a latency value, may vary depending on how the latency value is calculated, as will be discussed in more detail below. Typically although not necessarily, there may be more variation in the latency to pass through a particular network device (e.g. between ingress to the network device and egress from the network device) than the latency to travel over a specific connection from one network node to another.

A latency value is a specific instance of latency, usually although not necessarily a number indicative of latency. A latency value that is considered typical for a network device may be typical compared to historical latency values relevant to the network device. Such a latency value may be a symptom of a lowest level of network traffic congestion (also referred to as "congestion") for the network device. In contrast, an atypical latency value for a network device may be a symptom of a level of congestion for the network device that is above the lowest level. As processing time (e.g. time for switching/routing, etc.) in the network device is usually although not necessarily relatively constant, fluctuation(s) in latency value for a network device is usually although not necessarily caused by fluctuation(s) in time spent in queue(s). Therefore an atypical latency value may be considered to be a symptom of a level of congestion that is above the lowest level of congestion. Moreover as various data may be processed differently in a network device based on various characteristics to be described below, more than one congestion level may be determined in some cases for a network device.

Current and historical latency values, representative latency values (to be discussed below), and/or current and historical congestion values (also referred to as congestion levels) for one or more network devices in a network may be used to predict future latency, representative latency and/or congestion values for the network device(s). Additionally or alternatively, historical, current, and/or predicted latency, representative latency and/or congestion values may be indicated to user(s) (e.g. associated with the network), such as user(s) associated with: owner(s) and/or operator(s) of the network, service provider(s) of the network, customer(s) of the service provider(s), network administration of the network, design and/or manufacture, and/or the various network node(s) (e.g. with endpoint node(s)), etc. Some user(s) may be associated with the network in more than one capacity (e.g. associated with network administration and associated with one or more network node(s)). Additionally or alternatively, historical, current, and/or predicted latency, representative latency and/or congestion values may be used to determine recommendation(s) (e.g. for a network). The recommendation(s) may be outputted and/or autonomously/semi-autonomously applied (e.g. to the network). Additionally or alternatively outputted indication(s)/recommendation(s) may enable user(s) to perform action(s) (e.g. with respect to the network and/or other network(s)) such as specifying commitments, design, configuration, detection (e.g. of bottlenecks, effect(s) on performance), diagnosis (e.g. of problems), maintenance, modification (e.g. redesign, adjustment, reconfiguration, repairing, replacing, upgrading, provisioning, etc.), etc.

A network in accordance with the subject matter may include any appropriate network, where appropriateness may vary depending on the embodiment. For example, a network may be categorized based on: whether the network is publicly accessible (e.g. the Internet) or private (e.g. an Intranet), the geographical span of the network (e.g. a local area network, a wide area network, etc.), the usage of the network (e.g. a datacenter network, an enterprise network, etc.), the protocol(s) implemented by the network (e.g. packet based network, Internet Protocol (IP) network, etc.), the types of endpoints in the network (e.g. Internet of things, etc.), and/or any other suitable criteria. The term network will be referred to herein in the single form, even though in some cases a network may comprise a plurality of networks.

Data (also referred to as data traffic) may be transferred over a network in accordance with the subject matter using any appropriate wired and/or wireless technology, via any appropriate wired and/or wireless connections. For example, the data may be formatted in data packets. Network node(s) in a network which is in accordance with the subject matter may include any appropriate network node(s), such as connection point(s), redistribution point(s), endpoint(s), etc. Examples of an endpoint may include a storage machine, a server, a desktop computer, a laptop, a smartphone, a tablet device, a set-top box, an Internet-enabled television, a media center PC, a sensor, a drive, a camera, a robot etc. Examples of a network device may include: a firewall, load balancer, network interface card/controller, wireless network interface card/controller, repeater, modem, bridge, hub, switch (regular or multilayer), router, bridge-router, gateway, protocol converter, proxy server, network address translator, multiplexer, integrated services digital network terminal adapter, line driver, etc.

An Internet of Things (TOT) network may include as "thing(s)", such endpoints traditionally thought of as being in a network such as smartphones, servers, storage devices, drives, etc., and/or other endpoints not traditionally thought of as being in a network such as light(s); appliance(s); vehicle(s); heating, ventilating, and air-conditioning; window(s), window shade(s) and blind(s); door(s); lock(s); sensor(s); actuator(s), robot(s), camera(s), etc. An IOT network may include a private network and/or a publicly accessible network.

Reference is now made to FIG. 1 which illustrates a topology of a network 100, in accordance with some embodiments of the presently disclosed subject matter.

Network 100, as illustrated, is an IOT network connected to the Internet 110 and an Intranet 120. Network 100 includes a data plane 160 for transferring data (e.g. data packets) between various endpoints 130 and network devices 140. Endpoints 130 include, for example, a sensor 132, a drive 134, a camera 136 and a robot 138. In other examples, endpoints 130 may include fewer endpoints, more endpoints and/or different endpoints than shown in FIG. 1. Network devices 140 include for example, a router 142, and two switches 144 and 146. The egress and ingress ports of any network device 140 may include virtual and/or physical ports. In other examples, network devices 140 may include fewer network devices, more network devices and/or different network devices than shown in FIG. 1.

Data plane 160 includes, for example, connections 162, 164, 166, 168, 170 and 172. Network 100 further includes connections (e.g. uplinks and/or downlinks) 152 and 154 for transfer of data (e.g. data packets) between network 100 and Internet 110 and Intranet 120 respectively. Network 100 further includes a management plane 180 for transfer of administrative information between network devices 140 and a device manager system 190 (also referred to as "device manager 190"). Optionally management plane 180 includes a management switch 186 and therefore includes connections 182, 184 and 185 between network devices 140 and management switch 185, and a connection 188 between management switch 186 and device manager 190. Network 100 may also include a control plane (not shown) for signaling traffic (e.g. control packets). Although connections illustrated in FIG. 1 and discussed herein are represented as lines, the connections may be wired and/or wireless, as appropriate.

Network 100 may, in other embodiments, include fewer, more and/or different elements than shown in FIG. 1.

Additionally or alternatively, in other embodiments, network 100 may not necessarily be an TOT network.

The administrative information that is transferred to device manager 190 from network devices 140 may include any appropriate information regarding network 100. For example, the administrative information that is transferred may include timing information (also referred to herein as timing data), such as timestamps, latency values, and/or any other information relevant to the present subject matter, as will be understood from the description below. Optionally, timing data (e.g. based on network tapping) is additionally or alternatively transferred from other device(s) that do not function as network devices to device manager 190 (not shown).

Figure 2:
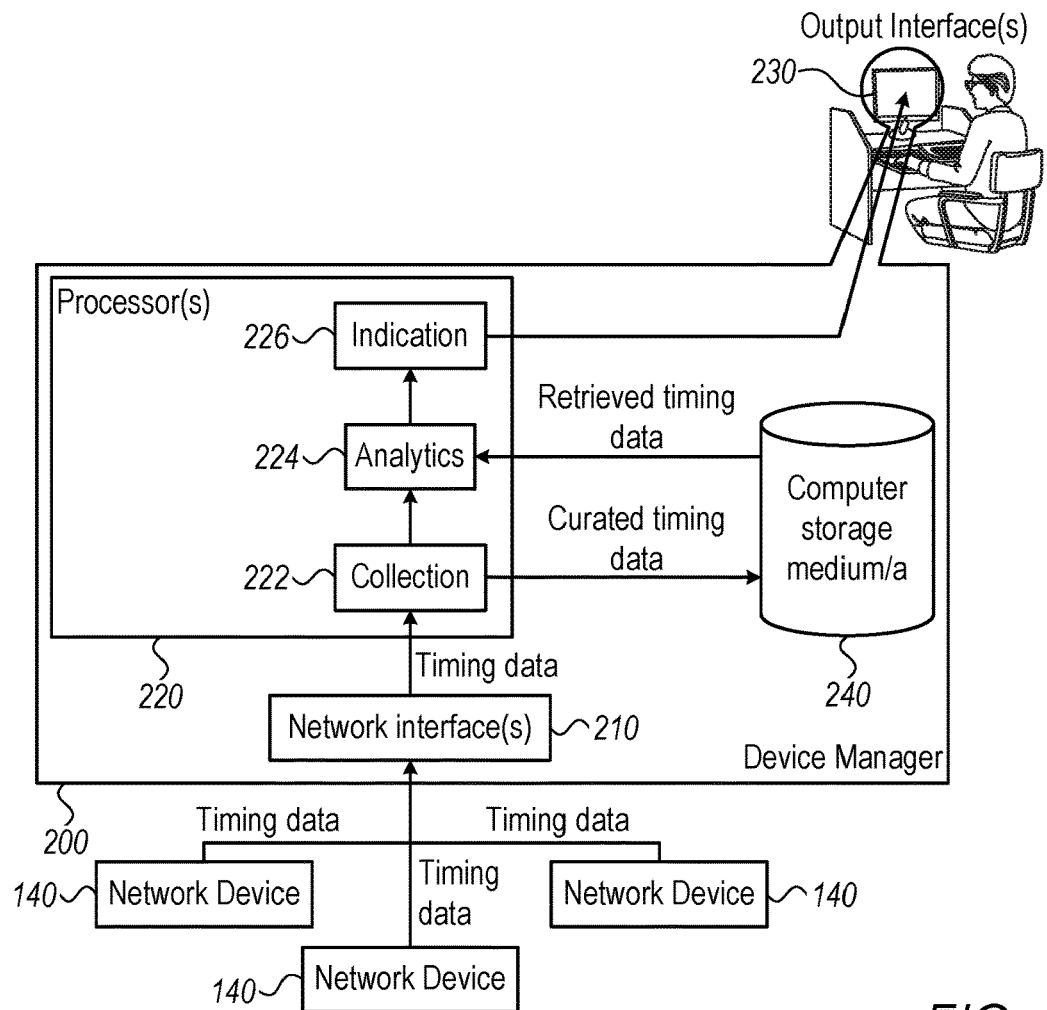
FIG. 2 is a block diagram of a device manager system, in accordance with some embodiments of the presently disclosed subject matter.

FIG. 2 is a block diagram of a device manager system 200, in accordance with some embodiments of the presently disclosed subject matter. Device manager system 200 is an example of device manager 190 of FIG. 1.

In FIG. 2 device manager system 200 ("device manager 200") is shown as comprising the following modules: at least one network interface 210, at least one processor 220, at least one output device 230, and at least one computer storage medium 240. One or more computer storage media is also referred to herein as "memory". Examples of processor(s) 220 may include graphics processing unit(s) ("GPU(s)"), digital signal processor(s) ("DSP(s)"), central processing units ("CPU(s)"), etc., as is known in the art. In FIG. 2 processor(s) 220 is shown implementing a collection module 222, an analytics module 224, and an indication module 226. A particular processor 220 which implements any of module(s) 222, 224, and/or 226 may be considered to be adapted to perform the functionality of the module(s) implemented by the particular processor. Although modules 222, 224, and 226 are described in single form, in some cases any of modules 222, 224, or 226 may be distributed over various machines having processors 220.

Processor(s) 220 may execute suitable software (e.g. in one or more computer readable media) to at least implement modules 222, 224 and 226; and optionally to implement other functionality related to the subject matter (e.g. determining recommendation(s) regarding network 100, applying recommendation(s) to network 100, etc.), and/or that is unrelated/tangential to the subject matter (e.g. conventional functionality such as functionality provided by Cisco Industrial Network Director that is unrelated/tangential to the subject matter). Software may include firmware, when appropriate.

A particular computer readable medium, for example, may include any suitable medium for transferring software, e.g. if software is downloaded to processor(s) 220 in electronic form, over a network (e.g. over network 100, 110, 120, etc.). Alternatively or additionally, a particular computer readable medium may, for example, include any computer storage medium 240 suitable for storing software, such as an optical storage medium, a magnetic storage medium, or an electronic storage medium. In the latter example, the location of an included computer storage medium 240 embodying software (also referred to as program code) relative to a particular processor 220 which reads the program code may vary depending on the embodiment and may include any appropriate location (e.g. in the same physical machine, local, remote, etc.).

Computer storage medium/a 240 may additionally or alternatively store database(s) which are organized collections of data relevant to device manager 200, such as the timing data discussed above. For example, the database(s) may be high performance database(s) suitable for big data analytics, and the computer storage medium/a 240 storing the database(s) may be suitable for such storage. Computer storage medium/a 240 may include, for instance, memory that is volatile, non-volatile, for long term storage, and/or for short term storage.

Collection module 222 may be at least adapted to curate timing data relating to network device(s) 140 that is received by network interface(s) 210, and to subsequently store curated timing data in memory 240. Analytics module 224 may be at least adapted to retrieve stored timing data and/or may be at least be adapted to analyze data (e.g. including retrieved timing data), for instance using big data techniques. The term big data techniques is used herein loosely to refer to techniques that can be used when there is a lot of data. Indication module 226 may be at least adapted to generate indication(s), including for instance visual representation(s). For instance, indication module 226 may be adapted to generate a wide range of visual representation(s), as will be apparent from the discussion below.

Output device(s) 230 is at least adapted to output indication(s) generated by indication module 226. For instance, output device(s) 230 may be adapted to output indication(s) by being included in a machine having processor(s) that at least implements indication module 226. A particular output device 230 may be included in a machine by being embedded in (or in other words built in to) the machine, or by being separate (e.g. a peripheral device) but operatively coupled (e.g. wireless and/or wired) to the machine. Additionally or alternatively, for instance, output device(s) 230 may be adapted to output indication(s) by being connected via a network (e.g. network 100, 110, 120, etc.) to a machine having processor(s) that at least implements indication module 226. Additionally or alternatively, for instance, output device(s) 230 may be adapted to output indication(s) by being included in a machine that is connected via a network (e.g. network 100, 110, 120, etc.) to a machine having processor(s) that at least implements indication module 226. Output device(s) 230 may include any appropriate output device(s) for outputting indication(s) such as speakers, printer(s), display(s) (e.g. touchscreen(s) and/or non-touchscreen(s)), etc., as is known in the art.

As shown in FIG. 2, network interface(s) 210 is at least adapted to receive timing data relating to network device(s) from network device(s) such as network device(s) 140 (FIG. 1). Network interface(s) 210 may additionally or alternatively be adapted to receive timing data relating to such network device(s) from elsewhere than such network devices; and/or to receive from such network devices and/or from elsewhere other administrative information as is known in the art.

The modules included in device manager 200 may be included in one or more machines. When the modules included in device manager 200 are included in various machines that are connected via a network (e.g. network 100, 110, 120, etc.), various network interfaces 210 are optionally additionally or alternatively adapted to send and receive indications generated by indication module 226. For example, one of the machines may be a computer that is a server device having processor(s) 220 that at least implements indication module 226, and another of the machines may be a particular output device 230. The indication(s) may be outputted on the particular output device 230. As another example, one of the machines may be a computer that is a server device having processor(s) 220 that at least implements indication module 226 and another of the machines may be a computer that is a user device (e.g. a personal computer, laptop, tablet, smartphone, etc., as is known in the art) which embeds or is operatively coupled to the particular output device 230. The user device, for instance, may include processor(s) 220 adapted to run a web browser and/or other software in order to receive indication(s) from the server device. The indication(s) may then be outputted on the particular output device 230. As another example, one of the machines may be a computer that is a user device having processor(s) 220 that at least implements indication module 226, and another of the machines may be a particular output device 230 that receives indication(s) from the user device and outputs the indication(s). Optionally, network interface(s) 210 are additionally or alternatively adapted to send data to network device(s) such as network device(s) 140, for instance in order to initially configure network 100, and/to in order to enable proper operation of network 100 subsequent to the initial configuration (e.g. including enabling autonomous or semi-autonomous application of recommendation(s) regarding network 100, enabling performance of action(s) regarding network 100 decided upon by user(s) associated with network 100), etc.

Device manager system 200 optionally includes other hardware and/or software for functionality that is related to the subject matter and/or for functionality that is unrelated/tangential to the subject matter. The other hardware may include, for example, input/output interface(s), input device(s) (e.g. keyboard(s), keypad(s), mouse device(s), microphone(s), etc.), etc.

In some embodiments, at least part of device manager 200 (e.g. one or more processors 220 and/or one or more computer storage media 240) is located on a cloud. For example, computer(s) that are server device(s) located on the cloud may include processor(s) 220 implementing at least part of the functionality of device manager 200. The service model employed, for example, may be software as a service where software relating to any of modules 222, 224, and 226 is a service provided to a computer that is a user device, e.g. via a web browser running on a particular processor 220 of the user device.

In some embodiments, software for any of modules 222, 224, and 226 may run on processor(s) 220 of computer(s) that are server device(s) not located on the cloud but located remotely from, or on site with user(s) to whom the indication(s) are to be outputted. Additionally or alternatively software for any of modules 222, 224, and 226 may run on processor(s) 220 of computer(s) that are user device(s) associated with user(s) to whom the indication(s) are to be outputted.

Additional details regarding the functionality of modules 222, 224, and 226, will be discussed in more detail below.

In some embodiments, two or more modules shown in FIG. 2 may be consolidated into fewer modules performing the functionality attributed to the two or more modules. Additionally or alternatively, one or more modules shown in FIG. 2 may be divided into a larger number of modules. Additionally or alternatively, functionality attributed herein to a particular module shown in FIG. 2 may instead or also be performed by one or more other module(s) of FIG. 2. In any of these embodiments, the software and/or hardware of the module(s) may be adjusted as necessary.

In other embodiments, device manager 190 may include any appropriate software and/or hardware to implement the functionality ascribed herein to device manager 190, and may not necessary include the module(s) and/or be configured as the example device manager 200 of FIG. 2.

Figure 3:
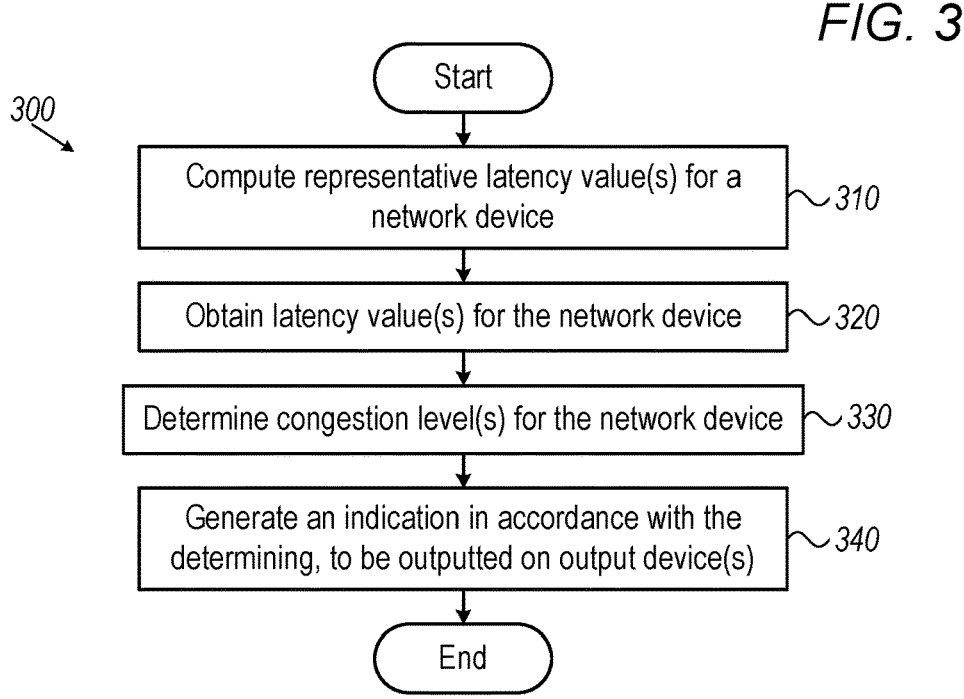
FIG. 3 is a flowchart of a method, in accordance with some embodiments of the presently disclosed subject matter.

FIG. 3 is a flowchart of a method 300, in accordance with some embodiments of the presently disclosed subject matter.

Method 300 will be described with reference to any one network device 140, referred to in the description of method 300 as network device 140.

In stage 310, device manager 190 (e.g. analytics module 224 of example device manager 200) computes one or more representative latency values for network device 140, based on a plurality of latency values obtained for a plurality of packets which passed through network device 140 over a period of time. For example, the plurality of packets may include control packet(s) and/or data packet(s). The plurality of latency values are indicative of latency between ingress to network device 140 and egress from network device 140.

Some or all of the plurality of latency values may have been sent as timing data relating to network device 140 by network device 140, by other network device(s) 140, and/or by other device(s). Additionally or alternatively, some or all of the plurality of latency values may have been computed by device manager 190 (e.g. analytics module 224 of example device manager 200) based on timing data (e.g. timestamps) relating to network device 140 (e.g. 142) that was sent by network device 140 (e.g. 142), by other network device(s) (e.g. 144, 146), and/or by other device(s).

Depending on the embodiment, the plurality of packets may be all of the packets which passed through network device 140 over the period of time, or may be less than all of the packets which passed through network device 140 over the period of time (i.e. may exclude at least one of the packets which passed through network device 140 over the period of time). For example, timing data may not necessarily be sent (e.g. by network device 140, etc.) to device manager 190 for all of the packets which passed through network device 140 during the time period; and/or device manager 190 may not necessarily compute representative latency value(s) based on all timing data received by device manager 190 for packets that passed through network device 140 during the time period. Continuing with describing the example, in some cases device manager 190 may compute representative latency value(s) for packets with certain value(s) of characteristic(s) (e.g. associated with: one or more egress ports of network device 140, one or more classes of service "COS", one or more qualities of service "QOS", one or more ingress ports, one or more flows, one or more Ethernet types, and/or one or more protocol numbers, etc.) and may therefore disregard other packets which passed through network device 140 during the time period. The egress port and/or other characteristic(s) for a particular packet may affect which queue(s) in network device 140 the particular packet traverses, and the time spent in such queue(s) may affect the latency value for the particular packet. Additionally or alternatively, for example, some timing data (e.g. outliers, malformed data, etc.) may not be used regardless of the packet characteristics. Continuing with describing the example, such timing data may be filtered out by collection module 222 of example device manager 200, prior to storing timing data in memory 240.

Timing data may not necessarily be sent for all packets that passed through network device 140 during the time period, for any suitable reason(s). The selection of packets for sending timing data may vary depending on the embodiment. For instance, the nth packet of any selected flow (where "n" may be any appropriate number) may be selected, a packet from any selected flow may be selected periodically at intervals of any appropriate time for the flow, or a packet from any selected flow may be selected episodically. In another instance, network device 140 may send timing data for packets randomly selected by network device 140. The seed and randomization packet may be picked such that there is no flow bias. In another instance, an edge network device (e.g. router 142 or switch 146) may mark certain packets belonging to a particular flow (e.g. specified by a network administrator). Such packets may be marked, for example, with a bit for specifying timing enabled. The edge network device and/or any other network device which receives the marked packets may send timing data for the marked packets. In such an instance, network device 140 may be the edge network device which marked the packets or any other network device which receives such packets. In another instance, an application (e.g. on one of endpoints 130) may mark some or all of the application packets with such a timing enabled bit. Timing data may consequently be sent for such packets. The marking may occur, for example, if the application is detected as being slower than expected on the network (e.g. on network 100). In some embodiments, timing data may be sent for all packets which passed through network device 140 during the time period.

Regardless of whether timing data is sent for all or only for certain of the packets which passed through network device 140 over the time period, the scheduling of the sending may vary depending on the embodiment. For instance, timing data per packet may be sent when available, timing data for a predetermined number of packets may be aggregated and sent, any timing data that has not yet been sent and is available may be sent periodically (e.g. every few seconds, every 30 seconds, etc.) or episodically, etc.

The period of time with reference to passing through network device 140 may be any appropriate period of time such as the time period from the beginning of operation of network 100 until currently, from the beginning of the day until currently, in the last hour, in the last minute, etc. The obtaining of the plurality of latency values by device manager 190 may include any appropriate procedures of obtaining such as retrieval from memory (e.g. from memory 240); receipt via network interface(s) (e.g. network interface(s) 210) as timing data; and/or calculation, e.g. using timing data such as timestamps retrieved from memory and/or received via network interface(s). For example, retrieval from memory of only relevant timing data (e.g. retrieving timestamps for calculating latency values for any of the plurality of packets and/or retrieving such latency values) may be performed by applying filters. Filters may be applied, for instance, by constructing the constraints characterizing the relevant timing data as a query to the database(s) in memory 240, in order to retrieve only the relevant timing data.

Any appropriate computation(s) may be used to compute the one or more representative latency values for network device 130, based on the plurality of latency values. In some embodiments, big data techniques may be used. For example, coreset(s) of values, approximating the plurality of latency values, may be used for computing representative latency value(s). Each value in the coreset may approximate, for instance, a closely clustered group from the plurality of latency values. Computation of the representative latency value(s) using coreset(s), may be quicker (e.g. computable in sub-linear time) than computation using the plurality of latency values, but may still be considered as being based on the plurality of latency values due to the approximation.

Computation of a representative latency value based on the plurality of latency values may not necessarily require treating all of the plurality of latency values (or all of the approximate coreset values) equally. Any appropriate function as is known in the art may be used. For example, all of the plurality of latency values or all of the coreset values may be given equal weight. As another example, latency values associated with later packets in the time period may be weighted more heavily than latency values associated with earlier packets in the time period. Additionally or alternatively, computation of representative latency value(s) based on the plurality of latency values may use previously computed representative latency value(s) that took into account a part of the plurality of latency values as shortcuts. In such a case, computation of representative latency value(s) using some of the plurality of latency value(s) and the previously computed representative latency value(s) may be considered as being based on the plurality of latency values, as the previously computed representative latency value(s) took into account a part of the plurality of latency values. Optionally, computed representative latency value(s) are stored in memory (e.g. memory 240), for instance as part of the stored timing data, and retrieved if and when required (e.g. for a current computation of representative latency value(s)).

When more than one representative latency value is computed for network device 140, the reasoning for computation of more than one latency value may vary depending on the embodiment. For example, representative latency value(s) associated with different egress ports and/or other characteristics may be calculated separately for network device 140. Continuing with describing such an example, a representative latency value may be calculated, for instance, for ingress via a particular ingress port and egress through a specific egress port of network device 140. The separate calculation(s) may be in addition to or instead of an overall calculation for network device 140.

As the computation of a particular representative latency value may include any suitable computation, the result may include any appropriate result. In various embodiments, the particular representative latency value may be, for instance, a mean value of the plurality of latency values; a median value of the plurality of latency values; a weighted average value of the plurality of latency values; an approximation of a mean value, median value or weighted average value of the plurality of latency values; a steady state value, etc.

In some embodiments, computation of a representative latency value that is based on the plurality of latency values may also take into account latency value(s) from after the period of time. For example, the computation may include latency value(s) obtained in stage 320 (see below). Such embodiments may be implemented, for instance, to simplify the filters discussed above.

In stage 320 device manager 190 (e.g. analytics module 224 of example device manager 200) obtains one or more latency values for one or more packets which passed through network device 140 after the period of time. The one or more packets may include control packet(s) and/or data packet(s). The one or more latency values obtained in stage 320 is/are indicative of latency between ingress to network device 140 and egress from network device 140.

For example, the latency value(s) obtained in stage 320 may be for the most recent packet(s) which egressed via network device 140 for which timing data is available to device manager 190; or the latency value(s) may be for the most recent packet(s) which egressed via network device 140 and which are associated with certain characteristics for which timing data is available to device manager 190. In such an example, the subsequent indication (see below discussion of stage 340) may be generated sooner after the time that the packet(s) associated with the latency value(s) egressed through network device 140 than if the packet(s) for which latency value(s) are obtained in stage 320 were earlier packet(s).

In some cases, only one latency value may be obtained in stage 320, such as the most recent latency value for network device 140, the most recent latency value for packets having certain characteristic value(s) (e.g. which egressed through a particular egress port), the maximum recent latency value when comparing the most recent latency values for packets with various characteristic values (e.g. having different classes of service), etc. In other cases, more than one latency value may be obtained for the egress port, such as the most recent latency values for the network device, the most recent values for packets with certain characteristic value(s) (e.g. which egressed through a particular egress port), the most recent values for packets with various characteristic values (e.g. the most recent values of packets each of which ingressed through a different ingress port) etc.

The obtaining of the latency value(s) by device manager 190 may include any appropriate procedures for obtaining such as retrieval from memory (e.g. memory 240); receipt as timing data via network interface(s) (e.g. network interface(s) 210; and/or calculation, e.g. using timing data such as timestamp(s) retrieved from memory and/or received via network interface(s). For example, retrieval from memory of the relevant timing data (e.g. timestamp(s) for calculating latency value(s) for packet(s) after the time period and/or such latency value(s).) may be performed by applying filters, as discussed above with reference to stage 310.

In some examples the packet(s), for which the latency value(s) are obtained in stage 320, may share characteristic value(s) with packet(s) whose latency value(s) were used in computing at least one of the representative latency value(s) computed in stage 310. However, in other examples, the packet(s) may not necessarily share characteristic value(s), as will be discussed in more detail with reference to FIGS. 4A and 4B.

Figures 4A, 4B:
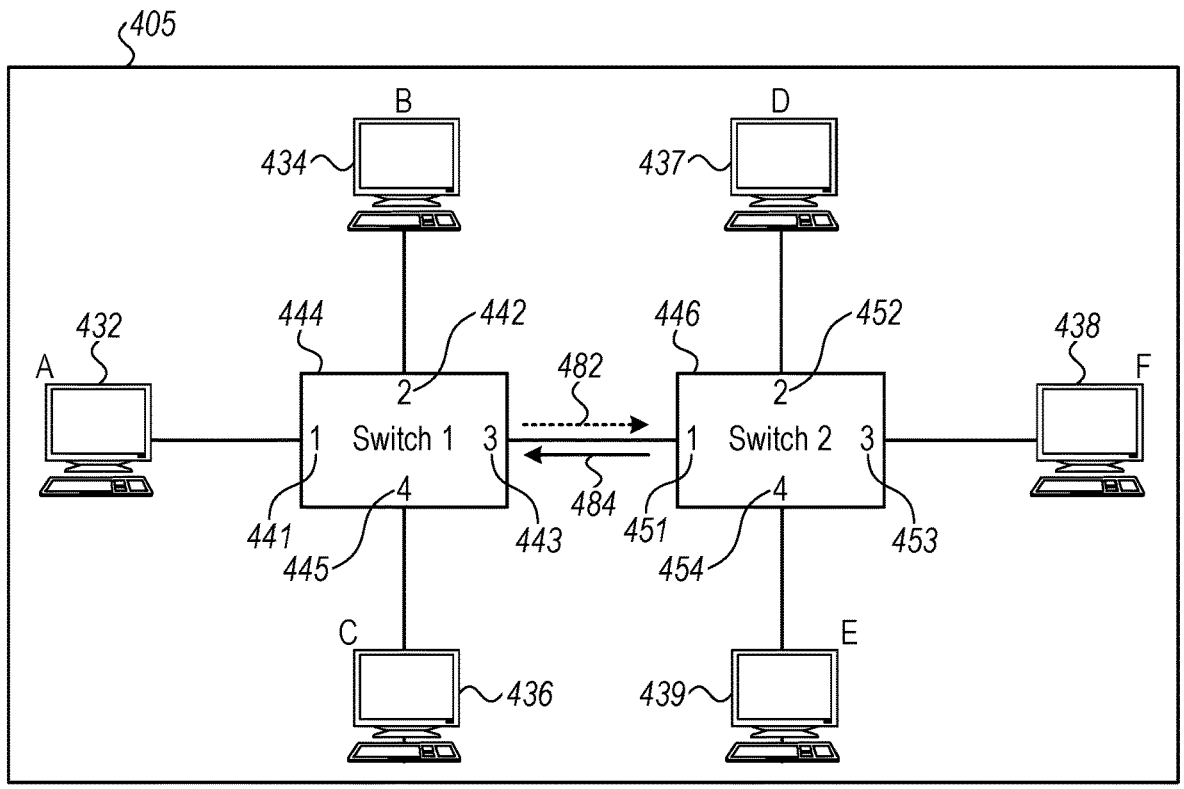
FIG. 4A illustrates a visual representation of a network, in accordance with some embodiments of the presently disclosed subject matter.
FIG. 4B illustrates two tables for the network of FIG. 4A, in accordance with some embodiments of the presently disclosed subject matter.

Reference is now made to FIG. 4A which illustrates a visual representation of a network 400, in accordance with some embodiments of the presently disclosed subject matter. The visual representation is presented on a display 405.

Network 400 is an example of network 100. Network 400 is restricted to two network devices 140, namely a switch1 444 and a switch2 446, and to endpoints 130 that are personal computers, namely personal computers 432, 434, 436, 437, 438 and 439. A port1 441, a port2 442, a port3 443 and a port4 445 are labeled in FIG. 4A on switch1 444, and a port1 451, a port2 452, a port3 453 and a port4 454 are labeled in FIG. 4A on switch2 446. As shown in FIG. 4A, personal computers 432, 434 and 436 are connected to switch1 444, and personal computers 437, 438 and 439 are connected to switch2 446. It is assumed that each of the ports 441, 442, 443, 445, 451, 452, 453, and 454 may function as an ingress port and as an egress port. The management plane is not shown.

FIG. 4B illustrates two tables 420 and 460 for network 400, in accordance with some embodiments of the presently disclosed subject matter. Tables 420 and 460 tabulate certain data associated with switch 442 and switch 446 respectively of FIG. 4A.

The representative latency value (e.g. obtained in stage 310 of FIG. 3) for switch1 444 is shown in Table 1 420 as 10 microseconds ("μs"). The representative latency value for switch2 446 as shown in Table 2 460 is 15 μs. Such representative latency values are examples, and in other examples the representative latency values may be different than illustrated. For example, the representative latency values may be the identical for switch1 444 and switch2 446, the representative latency value for switch1 444 may be higher than the representative latency value for switch2 446, etc. Additionally or alternatively, more than one representative latency value may be computed for one or for each of the switches 444 and 446. For example, a representative latency value may be computed for every ingress port/egress port combination of each switch (e.g. each of switch1 444 and switch2 446) using a function such as: $L_{rep}=f_1(l_{t-1}, l_{t-2}, l_{t-3} \ldots )$, where $f_1$ represents any appropriate function of latency values for the ingress port/egress port combination over a time period ending with time t−1, and $l_{t-1}$ represents the latency value for the ingress port/egress port combination at time t−1.

Table 1 420 and Table 2 460 of FIG. 4B further show latency values obtained, for instance, in stage 320 (FIG. 3). As shown in Table 1 420, latency value 422 is 8 μs for the combination of ingress port1 441 and egress port2 442, latency value 424 is 40 μs for the combination of ingress port1 441 and egress port3 443, latency value 426 is 9 μs for the combination of ingress port2 442 and egress port3 443, and latency value 428 is 10 μs for the combination of ingress port4 445 and egress port3 443. As shown in Table 2 460, latency value 462 is 15 μs for ingress port2 452 and egress port1 451, latency value 464 is 14 μs for ingress port 3 453 and egress port1 451, latency value 466 is 12 μs for ingress port4 454 and egress port1 451, and latency value 468 is 10 μs for ingress port4 454 and egress port3 453. Not all latency values for possible ingress port/egress port combinations are shown in Tables 420 and 460. It is noted that in FIG. 4B, each latency value (e.g. obtained in stage 320) relates to specific characteristics (namely a specific ingress port/egress port combination) whereas the representative values obtained in stage 310 are not differentiated for specific characteristics but are associated with switches 444 and 446 overall.

Continuing with the description of FIG. 3, in stage 330, device manager 190 (e.g. analytics module 224 of example device manager 200) determines a determination of one or more congestion levels of network device 140. For example, a set of possible congestion levels may include the values of low congestion, moderate congestion, or high congestion and a particular congestion level may be one of the set. As another example, a set of possible congestion levels may include the values of lower congestion or higher congestion, and a particular congestion level may be one of the set. In such examples, the low congestion level or lower congestion level may be considered to be the lowest congestion level in the set, and the other congestion level(s) may be considered to be congestion level(s) above the lowest congestion level. In such examples, the high congestion level or the higher congestion level may be considered to be the highest level of congestion in the set, and the other congestion level(s) may be considered to be congestion level(s) below the highest congestion level.

In some embodiments, a congestion level may be determined overall for network device 140. In such embodiments, the congestion level may be determined by comparing latency value(s) for packets that passed through network device 140 after the time period, with a representative latency value for the time period for network device 140. In some embodiments, additionally or alternatively, congestion level(s) may be determined for one or more values of a characteristic, and/or congestion level(s) may be determined for one or more values of a combination of characteristics. In such embodiments, the representative latency value(s), and/or the latency value(s) after the time period, that are compared may be associated with respective characteristic values. For example, congestion level may be determined per egress port of network device 140, or per ingress port of network device 140. As another example, congestion level may be additionally or alternatively determined per egress or ingress port in combination with (or in other words with reference to) value(s) of one or more other characteristics (e.g. ingress or egress port(s), class(es) of service, quality/ies of service, Ethernet type(s), protocol number(s), etc.). Continuing with describing the latter example, levels of congestion for a given egress or ingress port may be separately determined for different values of other characteristic(s) (e.g. for different ingress or egress ports, classes of service, qualities of service, Ethernet types, and/or protocol numbers, etc.). In the latter two examples where congestion levels are determined for different characteristic values, the congestion levels may or may not be the same for all the different characteristic values.

The determining of stage 330 may include analyzing at least one of the one or more latency values (obtained in stage 320) in relation to at least one of the one or more representative latency values (computed in stage 310). Such an analysis may enable a determination of whether or not a given latency value is typical and therefore a symptom of the lowest level of congestion, or atypical and therefore a symptom of a level of congestion that is above the lowest level of congestion.

The analyzing may include any appropriate analyzing. For example the analyzing may include any of the following: comparison of latency value(s) obtained in stage 320 to representative latency value(s) computed in stage 310; comparison of the highest latency value obtained in stage 320, or an average latency value, to a representative latency value computed in stage 310; calculating difference(s) between latency value(s) obtained in stage 320 and representative latency value(s) computed in stage 310 and comparing the difference(s) to threshold(s); calculating a difference between the highest latency value obtained in stage 320 and a representative latency value computed in stage 310 and comparing the difference to threshold(s); calculating an average difference and comparing the average difference to threshold(s); etc. The number of thresholds used may vary depending on the embodiment. For example, the number of thresholds used, if any, may be configurable by a user. In such an example, each threshold may be configurable, for instance, as a percentage of a representative latency or as an absolute value.

If the analyzing yields a plurality of results due to a plurality of latency values and/or a plurality of representative latency values being analyzed, the determination of congestion level(s) may use any appropriate method to take into account the plurality of results. For example, each result or each group of results may correspond to one congestion level; determination of a given congestion level may be reached only if all of the results leads to such a conclusion, if the majority of results lead to such a conclusion, or if at least one of the results leads to such a conclusion, etc.

Continuing with describing possible instances of the analyzing, it is assumed for the sake of illustration that a latency value for a particular egress port of network device 140 is being compared. For instance, a latency value for a particular egress port, regardless of the ingress port and other characteristics associated with the latency value, may be compared to a representative latency value computed for the particular egress port overall (e.g. computed based on a plurality of latency values not necessarily restricted by values of characteristics other than the particular egress port), or to a representative latency value computed for network device 140 overall (e.g. computed based on a plurality of latency values not necessarily restricted by values of characteristics). In another instance, a latency value for the particular egress port and that is associated with any of specific ingress port(s) and/or specific class(es) of service, quality/ies of service, flow(s), Ethernet type(s), protocol number(s), etc. may be compared to a representative latency value computed for the particular egress port with reference to the specific ingress port(s) and/or the specific other characteristic value(s). In another instance such a latency value for the particular egress port with reference to any of specific ingress port(s) and/or specific class(es) of service, quality/ies of service, flow(s), Ethernet type(s), protocol number(s), etc., may be compared to a representative latency value computed for the particular egress port overall or to a representative latency value computed for network device 140 overall. In another instance, an average latency value for a particular egress port may be calculated from latency values obtained for various ingress ports, classes of service, quality/ies of service, flows, Ethernet types, protocol numbers, etc. The average latency value for the particular egress port may be compared to a representative latency value computed for the egress port combined with the various ingress ports, classes of service, quality/ies of service, flows, Ethernet types, protocol numbers, etc. In another instance such an average latency value may be compared to a representative latency value computed for the egress port overall or to a representative latency value computed for network device 140 overall. In any of these instances, if the latency value is larger than the representative latency value, the congestion level may be determined to be above the lowest congestion level.

In another instance, latency values for the particular egress port combined with each relevant ingress port, class of service, quality of service, flow, Ethernet type, and/or protocol number etc. may each be compared to a representative latency value. The representative latency value may have been separately computed for each relevant combination of the particular egress port and other characteristic(s) (e.g. ingress/particular egress port combination, class of service/particular egress port combination, quality of service/particular egress port combination, flow/particular egress port combination, Ethernet type/particular egress type combination, protocol number/particular egress port combination, particular egress port combined with two or more characteristics, etc.). Additionally or alternatively a representative latency value may have been computed overall for the particular egress port of network device 140 or for network device 140 overall. If the latency value(s) for at least one, for a majority, or for all: characteristic(s) such as ingress port(s) and/or class(es) of service, quality/ies of service, flow(s), Ethernet type(s) and/or protocol number(s), etc. is/are greater than the representative latency value(s) to which the latency value(s) was compared, then the particular egress port may be determined to have a congestion level that is above the lowest congestion level. Additionally or alternatively, the comparison of latency value(s) to representative latency value(s) may lead to a determination of one or more congestion levels for the particular egress port.

In another instance, a difference may be computed between a latency value for a particular egress port and a representative latency value. The latency value may be, for instance, a latency value for a particular egress port overall, a latency value for the particular egress port combined with any of specific characteristic value(s), or an average latency value for the particular egress port calculated from latency values obtained for the particular egress port combined with various characteristic values(s). The representative latency value may have been computed for network device 140 overall, for the particular egress port overall, or for the egress port combined with the characteristic value(s) relevant to the latency value. If there is one threshold and the difference is above the threshold, or in other embodiments at least equal to the threshold, then the particular egress port may be determined to have a higher congestion level. Otherwise, the particular egress port may be determined to have a lower congestion level. If there are two thresholds and the difference is above a lower threshold but below a higher threshold, or in other embodiments at least equal to the lower threshold but below the higher threshold, then the particular egress port may be determined to have a moderate congestion level. If the difference is above the higher threshold, or in other embodiments at least equal to the higher threshold, the particular egress port may be determined to have a high congestion level. If the difference is below the lower threshold, or in other embodiments not higher than the lower threshold, then the particular egress port may be determined to have a low congestion level. In examples with more than two thresholds, the relationship between a difference and the various thresholds may translate into more than three levels of congestion.

In another instance, respective differences may be computed for a particular egress port. Each respective difference may be computed between a latency value for the particular egress port combined with one or more relevant characteristic values and a representative latency value computed for the network device overall, for the egress port overall, or for the particular egress port combined with relevant characteristic value(s). Examples of relevant characteristic value(s) may include relevant ingress port(s), class(es) of service, quality/ies of service, flow(s), Ethernet type(s), and/or protocol number, etc. In some cases of such an instance, an average difference may be computed for the particular egress port based on the computed respective differences. The average may be compared to one or more threshold(s) in order to determine the congestion level of the particular egress port. In other cases of such an instance, each difference may be compared to one or more threshold(s) in order to determine level(s) of congestion for the particular egress port, each with reference to specific characteristic value(s). In the latter cases, if there is one threshold, the egress port may be determined to have a higher level of congestion, for example, if any, a majority, or all of the differences is above the threshold, or in other embodiments at least equal to the threshold. Additionally or alternatively, the level of congestion for the particular egress port may be the highest level of congestion determined for any of the differences, the level of congestion determined for the majority of differences, or the lowest level of congestion determined for any of the differences, etc. Additionally or alternatively, a plurality of levels of congestion may be determined for the particular egress port, corresponding to the respective differences.

Although the instances above were described for a particular egress port, similar instances may be applied for determining congestion level(s) overall for network device 140 and/or for one or more characteristic value(s) (e.g. for one or more egress port(s), for one or more ingress port(s), for one or more class(es) of service, for one or more quality/ies of service, for one or more flow(s), for one or more Ethernet type(s), and/or for one or more protocol number(s), etc.), mutatis mutandis. Any level of congestion that is determined for network device 140 overall or for any characteristic(s) associated with network device 140 may be considered to be a level of congestion determined for network device 140. For example level(s) of congestion determined for network device 140 overall, and/or determined with reference to ingress port(s) of the network device, egress port(s) of the network device, quality/ies of service of packet(s) passing through the network device, flow(s) for packet(s) passing through the network device, Ethernet type(s) for packet(s) passing through the network device and/or protocol number(s) of packet(s) passing through the network device, etc., may be considered as level(s) of congestion determined for network device 140.

The instances of analyzing described above were provided for illustration purposes and are not meant to be necessarily exhaustive. It should be evident that other instances of analyzing may be suitable, depending on the embodiment.

It should further be evident that if a plurality of congestion levels are determined for network device 140, the composition of the congestion levels may vary depending on the embodiment and may include any appropriate composition. For example, there may be an overall congestion level for network device 140; congestion levels for different egress ports; for different ingress ports; for different egress or ingress ports combined with other characteristics; for packets of different classes of service egressing through a particular egress port and/or ingressing through a particular ingress port; for packets which ingressed through any of different ingress ports egressing through a particular egress port; for packets which ingressed through a particular ingress port and egressed through any of different egress ports; for packets from different flows egressing through a particular egress port; for packets with different Ethernet types egressing through a particular egress port and/or ingressing through a particular ingress port; for packets with different protocol numbers egressing through a particular egress port and/or ingressing through a particular ingress port; for packets with different qualities of service egressing through a particular egress port and/or ingressing through a particular ingress port; etc.

In some embodiments of stage 330, the determining of congestion level(s) for a network device may also take into account latency of downstream and/or upstream connection(s) for network device 140. For example, a difference between a latency value obtained in stage 220 and a representative latency value computed in stage 210 may be equal to a threshold and therefore the determination of a congestion level may be borderline between a first congestion level and a second congestion level, where the second congestion level is the higher of the two. The actual congestion level of network device 140 may be determined to be the second congestion level when the latency of the connection(s) is higher than usual (e.g. more than a few nanoseconds) as congestion in network device 140 may be assumed to be causing the latency at the connection(s) to be higher than usual. In this example, the actual congestion level may be determined to be the first congestion level if the latency of the connection(s) is not higher than usual. However, in other embodiments, since the latency of the connection(s) (e.g. in the order of a few nanoseconds) is typically although not necessarily much lower than the latency between ingress and egress of network device 140 (in the order of μs), the latency of the connection(s) may be ignored when determining congestion level(s) for network device 140. Latency of connection(s) may be determined, for instance, using the Precision Time Protocol (PTP), as is known in the art.

Any level of congestion of network device 140 may be modeled, in some examples, as an n-state Markov chain. For example, there may be two states, e.g. lower congestion and higher congestion. As another example, there may be three states e.g. low congestion, moderate congestion, and high congestion. A larger quantity of states is also possible.

Reference is again made to FIGS. 4A and 4B, in order to further illustrate some embodiments of stage 330. It is assumed that a lower threshold is set at 20 µs and a higher threshold is set at 30 µs. For each latency value shown in tables 420 and 460 with reference to an ingress port/egress port combination, a difference may be computed and compared to the thresholds. For example, the function may be represented as $L_i - L_{rep} \geq$ threshold for a congestion level to be above the lowest congestion level, where the subscript "i" may indicate any of the latency values in Table1 420 or Table2 460.

Referring to Table 1 420, for latency value 422 of 8 µs, the difference when subtracting the representative latency of 10 µs is −2 µs, and therefore below both thresholds. A congestion factor 412 is shown as an unfilled circle indicative of a low congestion level for this particular ingress port/egress port combination. For latency value 424 of 40 µs, the difference when subtracting the representative latency of 10 µs is 30 µs. This difference is equal to the higher threshold and therefore a congestion factor 414 is shown as a filled circle indicative of a high level of congestion for this specific ingress port/egress port combination. If say, the difference had instead been 25, below the higher threshold but at least equal to the lower threshold then the congestion factor may have been shown differently, say a half filled circle, indicative of the specific ingress port/egress port combination having a moderate congestion level. For latency value 426 of 9 µs, the difference when subtracting the representative latency is −1 µs, and therefore a congestion factor 416 is shown as unfilled circle. For latency value 428 of 10 µs, the difference when subtracting the representative latency is 0 µs and therefore a congestion factor 418 is also shown as unfilled circle.

For egress port3 443 on switch1 444, any of the latency values 424, 426 and/or 428 (and/or any of the differences being/not being above the threshold(s) for the various ingress ports 441, 442 or 445 as indicated by congestion factors 414, 416 or 418 respectively) may be relevant in determining an overall level of congestion for egress port3 443. Other than being restricted to egress port3 443, such an overall level of congestion is not necessarily restricted with respect to values of other characteristics. In the example illustrated in FIG. 4A, the determination of a level of congestion for egress port 443 is based on comparing the difference between the maximum latency value (from among latency values 424, 426 or 428) and the representative latency value of 10 µs, to the threshold(s). The maximum latency value is calculated as max $(L_{(i)}, L_{(j)}, L_{(k)})$ where i, j, k are the last 3 rows of Table 1 420. The maximum latency value is therefore latency value 424 of 40 µs. As 40 µs minus the representative latency value of 10 µs is equal to the higher threshold of 30 µs, egress port3 443 is determined to have a high level of congestion.

Instead of detecting the maximum latency value for calculating the difference and then comparing the difference to the threshold(s), a similar result may have been achieved if only the highest latency value 424 had been obtained in stage 320 or used in stage 330; and the difference between highest latency value 424 and the representative latency value of 10 µs then computed and compared to the threshold(s). Additionally or alternatively, a similar result may have been achieved if the highest difference of 30 µs for the egress port (as represented by congestion factor 414) were selected to be compared to the threshold(s).

Referring to Table 2 460, for latency value 462 of 15 µs, the difference when subtracting the representative latency of 15 µs is 0 µs, and therefore lower than both thresholds. A congestion factor 472 is shown as an unfilled circle indicative of low congestion for this particular ingress port/egress port combination. For latency value 464 of 14 µs, the difference when subtracting the representative latency of 15 µs is −1 µs. This difference is lower than both thresholds and therefore a congestion factor 474 is shown as an unfilled circle. For latency value 466 of 12 µs, the difference when subtracting the representative latency value is −3 µs, and therefore a congestion factor 476 is shown as an unfilled circle. For latency value 468 of 10 µs, the difference when subtracting the representative latency is −5 µs and therefore a congestion factor 478 is shown as an unfilled circle.

For egress port1 451 on switch2 446, any of the latency values 462, 464, or 466 (and/or any of the differences being/not being above the threshold(s) for the various ingress ports 452, 453 or 454 as indicated by congestion factors 472, 474 or 476 respectively) may be relevant to the determination of a level of an overall congestion for egress port1 451. In the example illustrated in FIG. 4A, the determination of a level of congestion is based on the difference between the maximum latency value among latency values 462, 464 or 466 and the representative latency value of 15 µs, compared to the threshold(s). The maximum latency value is calculated as max $(L_{(i)}, L_{(j)}, L_{(k)})$ where i, j, k are the first 3 rows of Table 2. The maximum latency value is therefore latency value 462 of 15 µs. As 15 us minus the representative latency of 15 µs is less than both thresholds, egress port1 451 is determined to have a low congestion level.

Referring back to FIG. 3, in stage 340, device manager 190 (e.g. indication module 226 of example device manager 200) may generate an indication in accordance with the determination in stage 330 of the congestion level(s). The indication is to be outputted on at least one output device (e.g. output device(s) 230 of example device manager 200). If the determination in stage 330 includes determination of a plurality of congestion levels an indication that is in accordance with the determination may be indicative of one, more than one, or all of the determined congestion level(s).

The indication may be visual and/or audio. An audio indication may include a tone or combination of tones, a played message, an alarm, a sound, an alert, etc. For example, a user may select from a library of audio files audio for indicating in stage 340. A visual indication may include textual and/or pictorial elements, e.g. to be presented on output device(s). For example, an indication that is purely textual may include a message (e.g. text message, email, etc.) regarding the level(s) of congestion, a pop-up regarding the level(s) of congestion, a list (e.g. of egress ports and/or ingress ports of network device 140 with certain levels of congestion), recommendation(s) to ease congestion, etc.

An indication which includes pictorial element(s) (and optionally other element(s) such as textual element(s), audio, etc.) is referred to herein as including visual representation(s). For instance, generating the indication may include generating one or more visual representation(s), to be presented on the output device(s) (e.g. output device(s) 230). In some embodiments, in order that a visual representation(s) be presented as soon as possible after the determination of level(s) of congestion, the visual representation(s) may be presented on output device(s) such as display(s) which may be updated sufficiently quickly to help a user identify potential problems as early as possible.

As is known in the art, an indication (e.g. including visual representation(s)) may be generated in any appropriate format that may be used by output device(s) (e.g. output device(s) 230) in order to output the indication (e.g. to present the visual representation(s)). Therefore the term indication (e.g. including visual representation(s)) is used herein when referring to either the generated indication or the outputted indication.

In some embodiments, the generation of an indication in stage 340 may occur due to the one or more congestion level(s) determined in stage 330 including a certain level of congestion (or in other words due to network device 140 having a certain level of congestion), and therefore the generation may be intrinsically indicative of the certain level of congestion, regardless of whether or not the indication includes a visual representation of the certain congestion level. The certain level of congestion may include, for instance, the lowest level of congestion, the highest level of congestion, any level of congestion above the lowest level, any level of congestion below the highest level, any of the two lowest, any of the two highest, etc. It is noted that in such embodiments, the generation may not necessarily be due exclusively to the determined congestion level(s) including the certain congestion level (or in other words not necessarily due exclusively to network device 140 having a certain level of congestion). For example, the generation may possibly be also due to other factors (e.g. due to the determined congestion level(s) including other congestion level(s) that are the same and/or different from the certain congestion level). The generation of the indication in stage 340 may include, for instance, generation of text (e.g. latency value(s)) to be outputted on output device(s). The latency value(s) may be generated for output due to a determination of network device 140 having a certain level congestion, such as a level above the lowest level of congestion, or the highest level congestion. Therefore in such an instance, the generation of the latency value(s) may be intrinsically indicative of network device 140 having a certain level of congestion, such as a level of congestion above the lowest level of congestion or the highest level of congestion. In other instances, the output of latency values may be independent of performance of method 300. For instance, latency values may be additionally or alternatively outputted upon specification of a user.

Visual representation(s) of congestion level(s) may in some embodiments include visual representation(s) of downstream connection(s) and/or of upstream connection(s) for network device 140. The visual representation(s) of the connection(s) may each have attribute(s) selected in accordance with the determination in stage 330. The attribute(s), for instance, may include any of: color, type of line/arrow/cloud (e.g. dashed, dotted, solid), thickness of line/arrow/cloud, fill/non-fill of line/arrow/cloud, wording (e.g. high congestion, moderate congestion, low congestion), etc. In some cases, the attribute(s) used for a particular connection may vary depending on whether the connection is wired, wireless or both, whereas in other cases such attribute(s) may be used for any connection, regardless of whether the connection is wired, wireless or both. Generating visual representation(s) of connection(s) in such embodiments may include, for example, selecting respective attribute(s) to represent the connection(s), where the attribute(s) is/are selected in accordance with the determining of stage 330. For instance, if one of the attribute(s) includes color, there may be two possible colors, one color selected for a higher determined level of congestion, and another color selected for a lower determined level of congestion. In another instance with color, there may be three possible colors, for determined low, moderate and high levels of congestion respectively.

Visual representation(s) of downstream and/or upstream connection(s) for network device 140 may be presented for network device 140 overall, and/or with reference to one or more characteristic(s). For example, assuming visual representation(s) presented at least with reference to port(s), visual representation(s) of downstream connection(s) from a particular egress port or upstream connection(s) to a particular ingress port may be presented for the particular port overall and/or for the particular port in combination with other characteristic(s). Continuing with describing such an example, if determined congestion level(s) relate to particular egress port(s) (e.g. overall and/or in combination with other characteristic(s)), the indication may include visual representation(s) of the downstream connection(s) from the particular egress port(s). If the determined congestion level(s) additionally or alternatively relate to particular ingress port(s) (e.g. overall and/or in combination with other characteristic(s), the indication may include visual representation(s) of the upstream connection(s) to the particular ingress port(s). For instance, a yellow line, arrow or cloud used for a connection may be indicative of a moderately congested port; a red line, arrow or cloud used for a connection may be indicative of a highly congested port; and a green line, arrow or cloud used for a connection may be indicative of a low congestion port.

Reference is again made to FIGS. 4A and 4B to further illustrate some embodiments of stage 340. As discussed above, egress port3 443 of switch1 444 was determined to have a high level of congestion and egress port1 451 of switch2 446 was determined to have a low level of congestion. Congestion levels were computed overall for egress ports 443 and 451 without differentiation regarding any other characteristics. In FIG. 4A, a dotted arrow 482 is shown representing the downstream connection from egress port3 443 of switch1 444 which was determined to have a high congestion level. Solid arrow 484 is shown representing the downstream connection from egress port1 451 of switch2 446 which was determined to have a low congestion level. The line between the arrows is included for clarity but may in some cases be omitted. If egress port3 had instead been determined to have a moderate congestion level, a dashed arrow, for instance, may be substituted for dotted arrow 482. It is noted that the selection of a dotted arrow to represent a high congestion level, and a solid arrow to represent a low congestion level is for illustration purposes, and in other embodiments, any attribute(s) may be selected to represent any congestion level.

It is further noted that in the example of FIG. 4A, the visual representations of the downstream connections from egress ports 443 and 451 are biased in favor of assisting a user that is viewing the visual representations to identify a potential problem early on. Arrow 482 is dotted, indicating a high congestion level, although only the difference between the latency value and the representative latency value for one ingress port/egress port combination in Table 1 420 (FIG. 4B) was equal to the higher threshold while the other differences were below the lower threshold. In other examples, the visual representation may be biased to not warn the user and therefore may be indicative of a low congestion level unless all of the ingress port/egress port combinations (and/or other characteristics combined with the egress port) had differences above one or both of the thresholds. In other examples, the visual representation may be more "unbiased" and indicative of a low congestion level unless a majority of the ingress port/egress port combinations (and/or other characteristics combined with the egress port) had differences above one or both of the thresholds.

It should be evident that visual representation(s) of congestion level(s) for network device 140 may not necessarily include visual representation(s) of downstream and/or upstream connection(s) for network device 140. For example, the manner that a given port of network device 140 is visually represented may additionally or alternatively be indicative of congestion level(s) (e.g. by way of color(s) used in association with the port; by representing the port as an open port for a low congestion level, a blocked port for a high congestion level or a semi-blocked port for a moderate congestion level; etc.). As another example, the manner in which network device 140 is visually represented in general may additionally or alternatively be indicative of congestion level(s). Continuing with describing the latter example, network device 140 may, for instance, be colored, highlighted or otherwise emphasized if at least one of the congestion level(s) that was determined is above a lowest level of congestion. The congestion level(s) may additionally or alternatively, in such an example, be indicated by way of color(s), type(s) of outline, shading, etc., used in visually representing network device 140. As another example, words such as "high congestion", "very congested" etc. that are outputted with respect to a port of network device 140 and/or with respect to network device 140 in general may be additionally or alternatively indicative of high congestion level(s). Words such as "moderate congestion" and/or "low congestion" that are outputted with respect to a port of network device 140 and/or with respect to network device 140 in general may be additionally or alternatively indicative of moderate and/or low congestion level(s).

Method 300 ends for network device 140. In some embodiments, stages of method 300 may be performed in a different order than the order illustrated in FIG. 3, and/or stages that are illustrated in FIG. 3 as being performed consecutively may be performed simultaneously. For example, stages 310 and 320 may be performed in a different order or simultaneously.

In some embodiments, method 300 may be repeated for network device 140, as appropriate, such as episodically, periodically, and/or consequent to one or more events. For example, method 300 may be repeated every few milliseconds, every few seconds, every minute, etc. As another example additionally or alternatively, method 300 may be initially performed once enough timing data has been received at device manager 190 to compute a representative latency value for network device 140. As another example additionally or alternatively, method 300 may be performed each time timing data (or a certain amount of timing data) is received for network device 140 by device manager 190. As another example additionally or alternatively, method 300 may be repeated upon request of a user such as a user associated with network 100. Continuing with describing the latter example, a user who has access to a visual representation of network device 140 (e.g. as part of a visual representation of network 100) may use a user input gesture such as a tap, a double tap, menu selection, double click, mouse-over, keypress, click and drag and/or right click etc. to specify network device 140 and thereby cause method 300 to be performed. Additionally or alternatively, the user may specify that an update is desired for network 100 causing method 300 to be performed for various network devices in network 100, including for network device 140.

In one example of a repetition of method 300 for network device 140, the computing in stage 310 may include updating at least one of the one or more representative latency values for at least one of the one or more latency values obtained in the previous iteration of stage 320, yielding at least one updated representative latency value. The obtaining in stage 320 may include obtaining one or more other latency values for one or more other packets which passed through the network device subsequent to the one or more packets for which the latency value(s) was obtained in the previous iteration of stage 320. The determining in stage 330 may include determining an update of congestion level(s) of network device 140, including analyzing at least one of the one or more other latency values in relation to at least one of the updated representative latency value(s). Additionally or alternatively, the determining of an update may include analyzing at least one of the one or more other latency values in relation to non-updated representative latency value(s) of the one or more representative latency values. The generating in stage 340 may include generating, in accordance with the update, an updated indication. If the determination of an update included a plurality of congestion levels, an indication that is in accordance with the update may be indicative of one, more than one, or all of the plurality of congestion level(s). It is noted that updating does not necessarily imply a change. An updated indication may be identical to the previous indication, for instance if both times the congestion level(s) were determined to be the same.

Referring now to all network devices 140 of network 100 (rather than to any one network device 140), in some embodiments method 300 may be performed once or a plurality of times for each of a plurality of network devices 140 of network 100. Depending on the embodiment, the plurality of network devices 140 may or may not include all network devices 140 in network 100.

Depending on the embodiment, indication(s) regarding different network devices 140 in network 100, when generated for instance by way of method 300, may or may not be outputted on a given output device (e.g. given output device 230) simultaneously. For example a visual representation of network 100 that is presented on a given output device 230 that is a display may in some cases include visual representations of congestion levels for various network devices 140 in accordance with the determining for the various network devices 140. As another example, particular visual representation(s) of congestion level(s) relevant to particular network device(s) 140 may additionally or alternatively be outputted separately. As another example additionally or alternatively, a list of all network devices 140 having a certain level of congestion may be outputted, and/or an identifier of each network device 140 having a certain level of congestion may be outputted independently.

Figure 5:
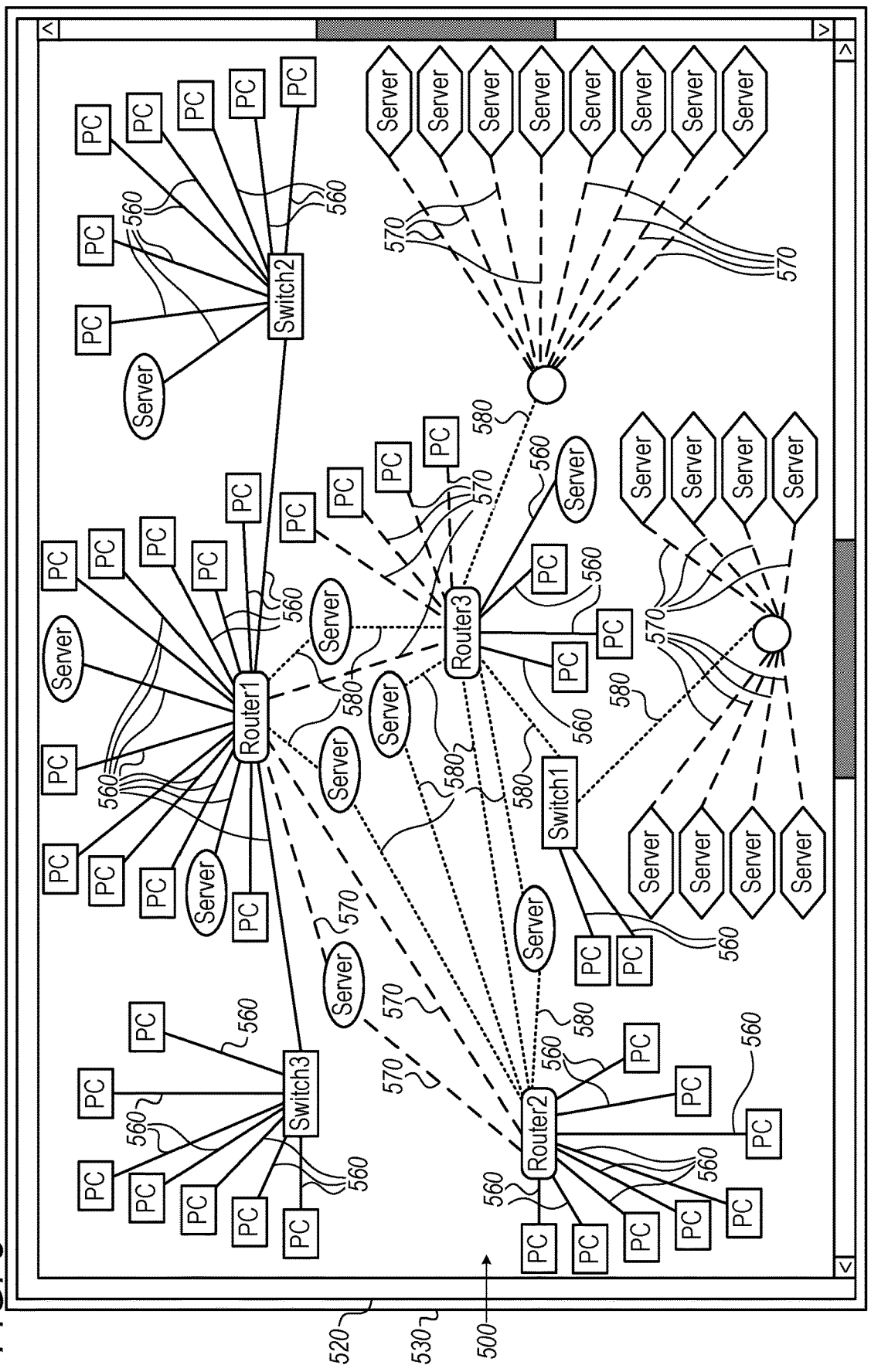
FIG. 5 illustrates a graphical user interface presented on a display, in accordance with some embodiments of the presently disclosed subject matter.

Reference is now made to FIG. 5 illustrating a graphical user interface 520 presented on a display 530, in accordance with some embodiments of the presently disclosed subject matter. Graphical user interface 520 includes a visual representation of a network 500.

Display 530 is an example of output device(s) 230. Network 500 is an example of network 100, expanded to include additional network devices and endpoints. A management plane and a device manager are not shown in FIG. 5.

In the visual representation of network 500 presented on display 530, various connections are shown as solid lines (560—low congestion level), dashed lines (570—moderate congestion level), and dotted lines (580—high congestion level). In a color display, the various connections may be additionally or alternatively colored as green (e.g. for low congestion level), yellow (e.g. for moderate congestion level), and red (e.g. for high congestion level). For simplicity of illustration, it is assumed that the same congestion level is determined for the network devices on either side of any one connection. Therefore the type of line selected for any one of the connections visually represents a congestion level of network devices on either side of the connection. In other examples, the level of congestion on each side of a connection may be separately represented by directional arrows.

Figure 6:
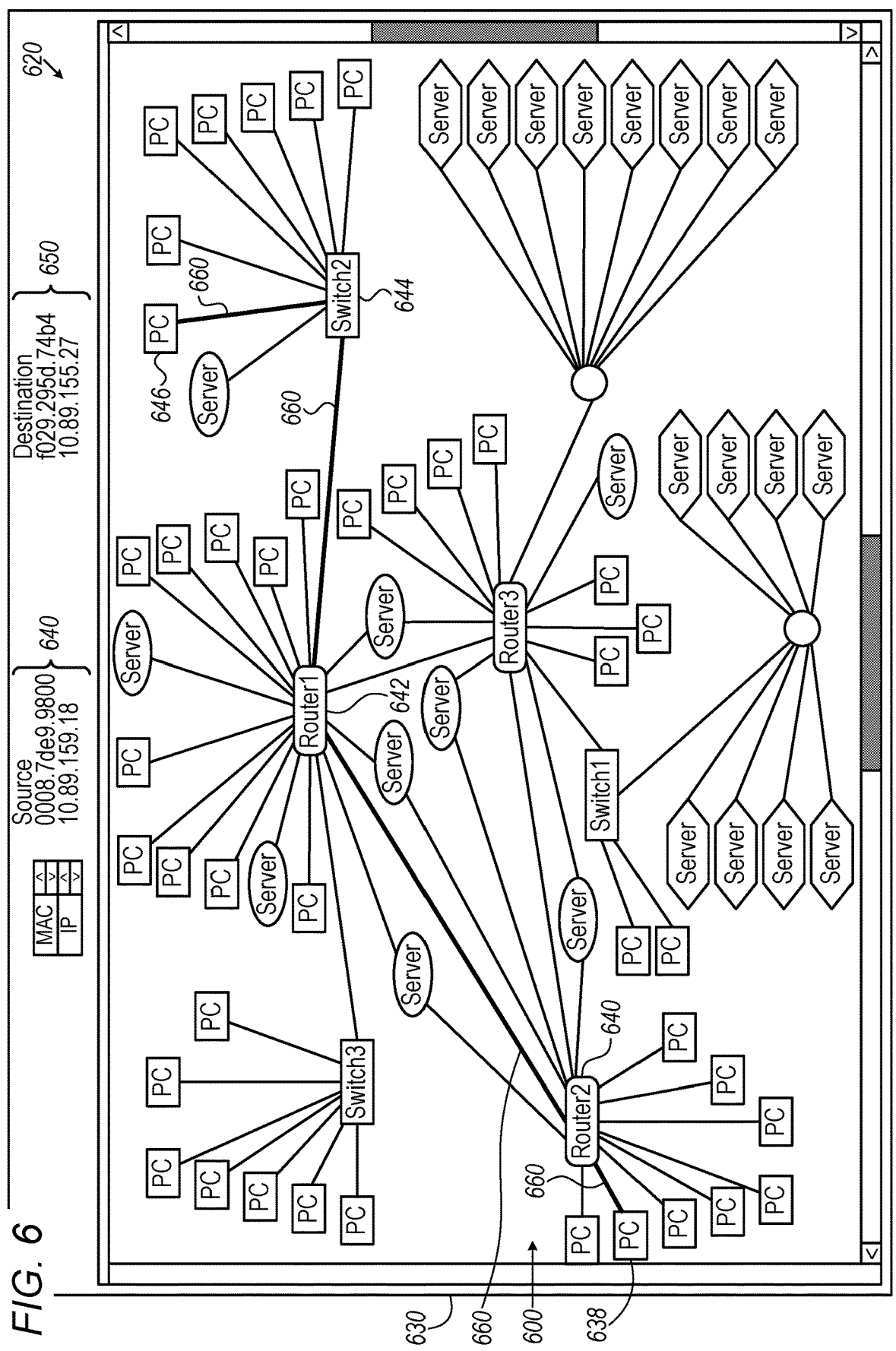
FIG. 6 illustrates another graphical user interface presented on a display, in accordance with some embodiments of the presently disclosed subject matter.

Reference is now made to FIG. 6, illustrating a graphical user interface 620 presented on a display 630, in accordance with some embodiments of the presently disclosed subject matter.

Graphical user interface 620 includes a visual representation of a network 600. Network 600 is assumed to be the same network as network 500. Display 630 is an example of output device(s) 230.

Graphical user interface 620 includes selectable menus 640 and 650 for specifying a source endpoint and a destination endpoint. For example, the Media Access Control ("MAC") and Internet Protocol ("IP") addresses may be specified, as shown in FIG. 6. Additionally or alternatively, the source port and destination port may be specified. As a result a path 660 of the flow from source to destination is shown on graphical user interface 620. Between the endpoints 638 and 646, path 660 passes through router2 640, router1 642 and switch2 644. Endpoints 638 and 646 are examples of endpoints 130 (FIG. 1). Routers 640 and 642 and switch 644 are examples of network devices 140 (FIG. 1). A user may specify, for instance, the parameters of a flow that the user suspects or knows is problematic.

Additionally or alternatively, path 660 may be presented autonomously, for instance if a network device (e.g. 640, 642, or 644) on path 660 is determined to have a certain congestion level, such as a congestion level above the lowest level of congestion or the highest level of congestion, e.g. in stage 330 of FIG. 3. In this case, the generation of an indication in stage 340 (discussed above) may include the generation of the visual representation of network 600 shown in FIG. 6 that includes path 660. Such a generation may be due to a network device on path 660 having a certain level of congestion and therefore be intrinsically indicative of the network device on path 660 having the certain level of congestion.

Figure 7:
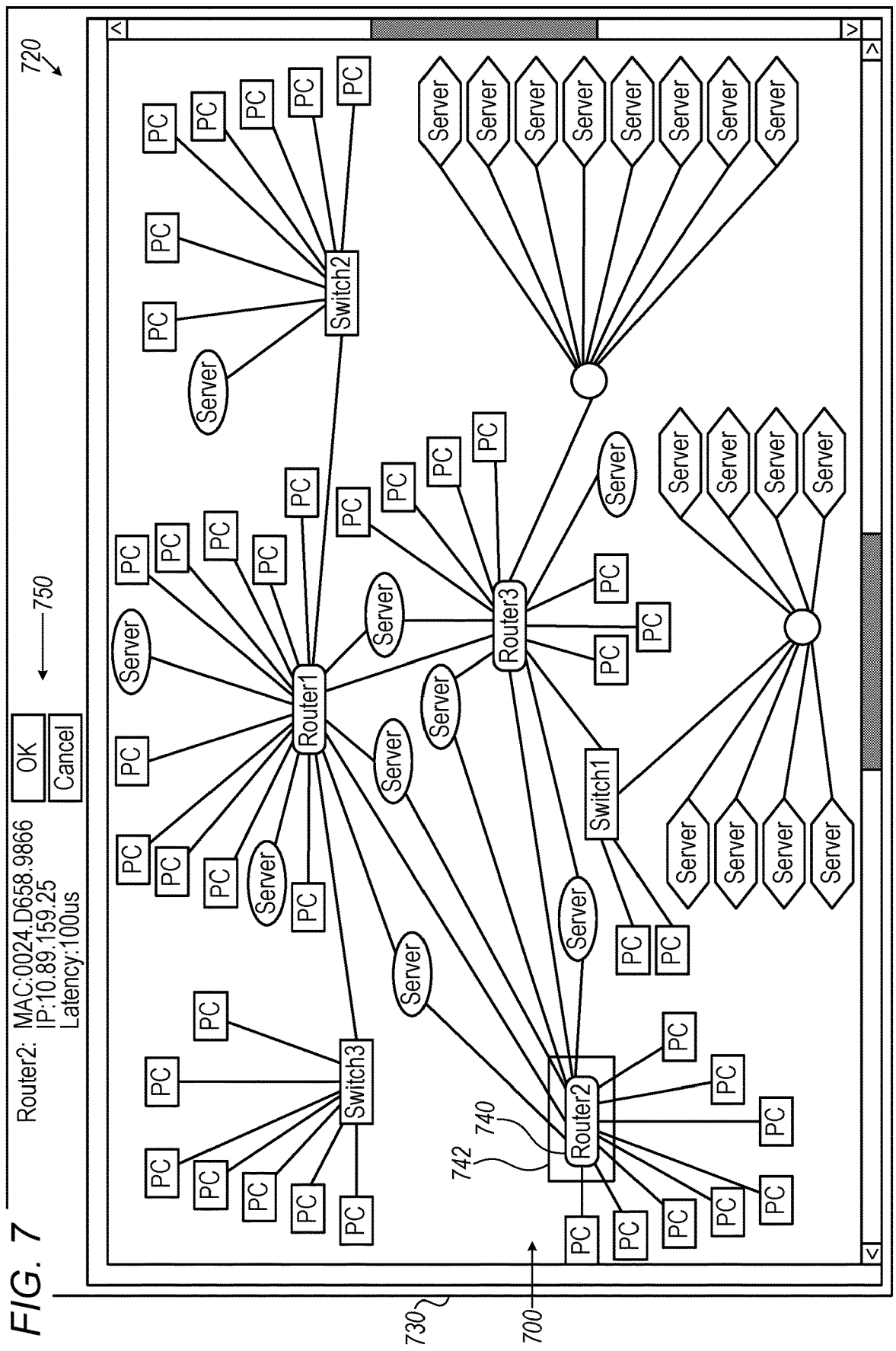
FIG. 7 illustrates another graphical user interface presented on a display, in accordance with some embodiments of the presently disclosed subject matter.

Reference is now made to FIG. 7, illustrating a graphical user interface 720 presented on a display 730, in accordance with some embodiments of the presently disclosed subject matter.

Graphical user interface 720 includes a visual representation of a network 700. Network 700 is assumed to be the same network as network 500. Display 730 is an example of output device(s) 230.

In FIG. 7, graphical user interface 720 allows any network device in network 700 to be selected and a latency value for the specified network device to be presented. For example, router2 740 is shown selected by way of a box 742 around router2 740. A user may use a user input gesture such as a tap, a double tap, menu selection, double click, mouse-over, keypress, click and drag and/or right click etc., to select router2 740. Additionally or alternatively, router2 740 may be selected autonomously if router2 740 is determined to have a certain level of congestion, such as a congestion level above the lowest level of congestion or the highest level of congestion.

Additionally or alternatively and referring again to FIG. 6 above, it is noted that path 660 included router2 640 (which in FIG. 7 is labeled 740). A user may select network device(s) on path 660, or such network device(s) may be selected autonomously once path 660 has been presented, so that latency value(s) for network device(s) of one or more hops of path 660 may be shown.

Graphical user interface 720 includes a section 750 showing a latency value for selected router2 740 and other information regarding router2 740. For example the most recent latency value (or the most recent latency value that was not filtered out, e.g. by collection module 222 of example device manager 200) for router2 740 may be shown. The latency value that is presented may have been obtained by device manager 190 (e.g. analytics module 260 of example device manager 200) by receiving the latency value as timing data for router2 740 (e.g. most recently received); by retrieval of the latency value from memory (e.g. retrieve the most recent latency value that is in memory 240); by calculation (e.g. from received and/or retrieved timing data such as timestamp(s)); etc.

The generation of text with respect to router2 740 (e.g. latency value and other information to be presented on display 730) may be included in the generation of an indication in stage 340 of FIG. 3, e.g. in addition to or instead of generation of the visual representation of network 600 shown in FIG. 6 that includes path 660. Such generation of text, if occurring because router 2 740 is determined to have a certain congestion level, such as a congestion level above the lowest level of congestion, or the highest level of congestion, may be intrinsically indicative of router2 740 having, say, a congestion level above the lowest level of congestion, or the highest level of congestion.

Reference is now made to FIG. 8 which illustrates a bar graph 800, in accordance with some embodiments of the presently disclosed subject matter. Bar graph 800 is presented on a display 805.

Bar graph 800 is an example of a visual representation of latency values that may be presented on display 805, where display 805 is an example of output device(s) 230.

Bar graph 800 illustrates latency values (e.g. the most recent latency values, or the most recent latency values which were not filtered out) for various classes of service ("COS") of a given network device 140 of network 100 (say router2 640/740 of network 600/700 of FIGS. 6/7)). As shown in FIG. 8, COS2 810 has the highest latency value of the classes. It is noted that typically although not necessarily, packets of different classes of service traverse different queues in the given network device 140 and therefore may experience different latencies. The class of service of a packet may be determined, for example, from the virtual queue identifier of a packet. Therefore as long as the virtual queue identifier (or other appropriate data) is included in the timing data provided for the given network device 140 to device manager 190, device manager 190 may be able to distinguish among various classes of service.

For example, the most recent latency values (or the most recent latency values that were not filtered out, e.g. by collection module 222 of example device manager 200) for the various classes of services may have been obtained by device manager 190 (e.g. by analytics module 260 of example device manager 200) for the given network device 140. The various classes of service may have been determined from the various virtual queue identifiers (or from other appropriate data). The most recent latency values (or the most recent latency values that were not filtered out) for the various classes of service may have been obtained by device manager 190 receiving the latency values as timing data for network device 140 (e.g. most recently received); by retrieval of the latency values from memory (e.g. retrieve the most recent latency values that are in memory 240); by calculation (e.g. from received and/or retrieved timing data such as timestamps); etc.

In some embodiments, bar graph 800 may be presented for the given network device 140 (e.g. router2 640/740) upon user selection of the given network device 140. For instance, if router2 740 is selected as discussed above with reference to FIG. 7, bar graph 800 for router2 740 may be presented. Additionally or alternatively, bar graph 800 may be presented, for instance, upon a user input gesture regarding a visual representation of a level of congestion. For instance, clicking or tapping on arrow 482 (FIG. 4) or on any of lines 570 or 580 (FIG. 5) may cause bar graph 800 to be presented for an associated network device 140 (e.g. for switch1 444 of FIG. 4 or for an associated network device in FIG. 5).

Additionally or alternatively, bar graph 800 may be generated autonomously, e.g. due to a determination that a given network device 140 has a certain congestion level, such as a congestion level above the lowest level of congestion or the highest level of congestion, e.g. in stage 330 of FIG. 3. For example, once a given network device 140 is determined to have the certain level of congestion in stage 330 of FIG. 3, generation of an indication in stage 340 may include generation of bar graph 800 for classes of service of packets which passed through the given network device 140. In such an example, the generation of bar graph 800 is intrinsically indicative of the given network device having, say, a congestion level above the lowest level of congestion, or the highest level of congestion.

In addition to or in instead of generation of indication(s) (e.g. including visual representation(s)) in accordance with one or more current determinations of congestion level(s) for one or more network devices 140, as described above, device manager 190 may generate indication(s) (e.g. including visual representation(s)) in accordance with other current value(s), in accordance with historical value(s) and/or in accordance with predicted value(s).

FIG. 9 is a flowchart of a method 900, in accordance with some embodiments of the presently disclosed subject matter. Method 900 will be described with reference to any one network device 140, referred to in the description of method 900 as network device 140.

In stage 905, device manager 190 (e.g. analytics module 224 of example device manager 200) obtains latency values. For example, device manager 190 may obtain the latency values discussed above with reference to stage 310 (the plurality of latency values) and/or with reference to stage 320 (the one or more latency values). Such latency values may include historical and/or current latency values.

In stage 910, device manager 190 (e.g. analytics module 224 of example device manager 200) curates, compresses and/or stores the latency values. For example, device manager 190 may eliminate outliers. Outlier elimination may be performed, for instance, if not previously performed (e.g. by collection module 222 of example device manager 200). Device manager 190 may additionally or alternatively stream and/or sample coresets in order to compress the latency values (e.g. after outlier elimination). Compressed data may be used, for example, to compute representative latency value(s) (e.g. see above stage 310 discussion of computing representative latency value(s)). Such representative latency value(s) may include historical and/or current representative latency value(s). Device manager 190 may additionally or alternatively store the latency values (e.g. after outlier elimination and compression) and/or representative latency values in a high performance database (e.g. in memory 240).

In stage 915, device manager 190 (e.g. analytics module 224 of example device manager 200) obtains congestion values (also referred to as congestion levels). The congestion values may be obtained, for instance, by way of iterations of stage 330 of FIG. 3 discussed above. During an iteration, congestion value(s) may be selected from members of a finite set of values. For example, the set may include two or more members depending on the quantity of distinguishing levels of congestion. One possible set, for instance, may include the values of lower congestion and higher congestion, whereas another possible set may include the values of low congestion, moderate congestion, and high congestion. The congestion values may be additionally or alternatively stored in memory (e.g. memory 240 of example device manager 200) as timing data. The congestion values may include historical and/or current congestion values.

In stage 920, device manager 190 (e.g. analytics module 224 of example device manager 200) orders the latency values, representative latency values, and/or congestion values (from any of stages 905 to 915) by associated times. For example the time associated with a given latency value may be the time that the latency value was calculated or the time that the latency value was received by device manager 190. Alternatively, a given network device 140 may include the date and time of day that a given data packet was processed in the information sent to device manager 190, and in such a case the time associated with the given latency value may be the included date and time of day. The time associated with a given representative latency value may be, for example, the time of calculation of the given representative latency value or the latest time among the times of the latency values used to calculate the given representative latency value. The time associated with a given congestion value may be, for example, the time of determination of the congestion value (e.g. in accordance with stage 330 discussed above).

In stage 925, the ordered latency values, representative latency values, and/or congestion values are analyzed by device manager 190 (e.g. by analytics module 224 of example device manager 200) in order to determine one or more patterns from the values, such as repeating pattern(s), trend pattern(s), etc. For example, if network 100 of FIG. 1 services a workplace, the number of packets originating from worker laptops may increase from 7 AM to 9 AM as workers arrive at work, and after work hours the number of packets relating to maintenance may increase. The periodicity of such packets may result in one or more repeating congestion and/or latency patterns. In another workplace example, as the workforce grows, there may be an increase in the number of packets. The upward trend in number of packets may cause upward congestion and/or latency trend pattern(s). In the above workplace examples, analysis in stage 95 may determine such repeating or upward patterns. Determined pattern(s) may be mathematically represented by function(s), which in turn may be used in prediction.

For example latency values may be mathematically represented by the following function: $L_t=f(L_{t-1}, L_{t-2}, L_{t-2}\ldots)$, where $L_t$ is the latency at time t and f is a function determined by way of the analyzing of stage 925.

In some embodiments, the analyzing in stage 925 may include determining regression coefficients over time. The regression coefficients over time may embody function(s) that represent the determined pattern(s). Moving averages is an example of a technique that may be used to determine the regression coefficients over time.

In stage 930, device manager 190 (e.g. analytics module 224 of example device manager 200) predicts future latency values, representative latency values, and/or congestion values, based on the analysis performed in stage 925.

For example, pattern(s) determined in stage 930, e.g. as represented by function(s), may be used to predict congestion, representative latency and/or latency values. Continuing with describing such an example, regression coefficients over time may be used to predict congestion, representative latency and/or latency values.

Future latency values may be predicted from ordered latency values, for instance using the regression coefficients over time for the ordered latency values.

Additionally or alternatively, future representative latency values may be predicted, for instance, by way of a computation that uses past latency values, current latency values and/or predicted latency values, where the computing may be performed as discussed with reference to stage 310. Future representative latency value(s) may be additionally or alternatively predicted from ordered representative latency values, for instance using the regression coefficients over time for the ordered representative latency values.

Additionally or alternatively, future congestion values may be predicted from ordered congestion values (e.g. determined in a plurality of iterations of stage 330 of FIG. 3). The prediction may use, for instance, the regression coefficients over time for the ordered congestion values.

Additionally or alternatively, future latency values may be predicted, for instance, using the regression coefficients over time for the ordered latency values. Future congestion values may then be predicted using method 300. Continuing with describing such an instance, using latency value(s) predicted for a future timepoint (e.g. where the future timepoint is after the timepoints associated with latency values used to compute the representative latency value(s)), congestion value(s) at the future timepoint may be determined by analyzing at least one of the latency value(s) predicted for the future timepoint in relation to at least one representative latency value(s) which is relevant to the future timepoint. Prediction of congestion value(s) may be repeated for various future timepoints. The relevant representative latency values for the future timepoints may be the representative latency values predicted as discussed above for the future timepoints. The relevant representative latency values used for the analysis may differ for various future timepoints or may be the same. The relevant representative latency values may be the same for the analysis regarding all future timepoints, for instance, if when computing a predicted representative latency value for a given future timepoint based on latency values, the predicted latency values associated with earlier future timepoints are not taken into account (or in other words if the predicted representative latency value is the same as a current or historical representative latency value).

In stage 935, one or more techniques are applied by device manager 190 (e.g. by analytics module 224 of example device manager 200) to the ordered latency, congestion, and/or representative latency values. Additionally or alternatively, one or more techniques are applied by device manager 190 (e.g. by analytics module 224 of example device manager 200) to the predicted future latency, representative latency and/or congestion values associated with future timepoints. Such technique(s) may include one or more of the following: clustering, curve fitting, curve smoothing, etc. Curve fitting, if applied, may include any appropriate type(s) of curve fitting such as linear, exponential, logarithmic, polynomial, moving averages, etc.

In stage 940, graphs(s) of historical, current and/or future (e.g. latency, representative latency, and/or congestion) values against time are generated by device manager 190. For instance the graphs may be generated by indication module 226 of example device manager 200. Such graph(s) are visual representation(s) of such values and may be presented on output device(s) (e.g. output device(s) 230). Predicted value(s) may be plotted on the same graph as current and/or historical values; and/or predicted value(s) may be plotted on a separate graph. In some embodiments, the historical, current, and/or predicted values may include a plurality of values associated with a particular timepoint (e.g. a plurality of latency values, representative latency values, congestion values, etc.). In such embodiments, a given graph that is a visual representation of the values may show all of the plurality of values associated with the particular timepoint; or may show one or more of the values associated with the particular timepoint, or a function (e.g. minimum, maximum, mean, median, etc.) of one or more of the values associated with the particular timepoint, and not necessarily all of the associated values. Method 900 then ends.

Method 900 may be performed once or a plurality of times for network device 140. In some embodiments, method 900 may be repeated for network device 140 as appropriate, for instance, episodically, periodically, and/or consequent to one or more events. For example, method 900 may be repeated every few milliseconds, every few seconds, every minute, etc. As another example, method 900 may be additionally or alternatively repeated upon specification of a user such as a user associated with network 100 who has access to any output device (e.g. any output device 230) presenting the graph(s) generated in stage 940.

In some embodiments, method 900 may be additionally or alternatively performed when stage 330 of FIG. 3 determines that network device 140 has a certain congestion level, such as a congestion level above the lowest level of congestion or the highest level of congestion. In such embodiments, stages 905, 910, and 915 may be inherently performed as part of the performance of stages 310, 320 and 330. In such embodiments, the generation of an indication in stage 340 of FIG. 3 may include the generation of one or more graphs in stage 940. Since the generation of such graph(s) is performed due to a determination that the network device has a certain congestion level, such as a congestion level above the lowest level of congestion, or the highest level of congestion, the generation is intrinsically indicative of network device 140 having, say, a congestion level above the lowest level of congestion, or the highest level of congestion.

In some embodiments, method 900 may include fewer, more and/or different stages than illustrated in FIG. 9. For example, not all of the stages that are illustrated may be necessary in order to generate certain graph(s) in stage 945. Additionally or alternatively, in some embodiments, stages in method 900 may be performed in a different order than the order illustrated in FIG. 9. Additionally or alternatively, in some embodiments, two or more stages in method 900 that are illustrated in FIG. 9 as being performed consecutively, may be performed simultaneously.

Referring now to all network devices 140 of network 100 (rather than to any one network device 140), in some embodiments method 900 may be performed once or a plurality of times for each of a plurality of network devices 140 of network 100. Depending on the embodiment, the plurality of network devices 140 may or may not include all network devices 140 in network 100.

Examples of graphs which may be generated, for instance in stage 940 of method 900, will now be discussed with reference to FIGS. 10 to 14.

FIG. 10 illustrates a graphical user interface 1010 presented on a display 1005, in accordance with some embodiments of the presently disclosed subject matter. Display 1005 is an example of output device(s) 230.

Graphical user interface 1010 includes a graph 1000. Graph 1000 is a visual representation of historical and current latency values. Graphical user interface 1010 also includes selectable menus 1020, 1030A, 1030B, and 1040. A user may select a given network device 140 in network 100 for which to show the graph, using menu 1020. Router 1 (e.g. router 142 of FIG. 1) is shown as selected in FIG. 10. A user may select the range of dates for the latency values, using menus 1030A and 1030B. As shown in FIG. 10, the date range of Oct. 31, 2106 to Nov. 30, 2016 is selected. For example Nov. 30, 2106 may be the current date of presentation of graphical user interface 1010. However, as another example, the graph may not include any latency values for the current date and/or time. Graph 1000 shows a zoomed in section of the selected date range, namely the last 40 minutes of data. A user may filter the latency values, for characteristics such as flow identifier, quality of service, virtual queue identifier (VQId), etc., using menu 1040. As shown in FIG. 10, the latency values are not being filtered as "All" is shown as selected.

Graph 1000 shows the latency values visually represented by three curves, maximum curve 1050, mean curve 1060, and minimum curve 1070. For example the latency values may be filtered to select the maximum latency value, minimum latency value and mean latency value per minute. The maximum latency value per minute may be used as a basis for maximum curve 1050. The mean latency value per minute may be used as a basis for mean curve 1060. The minimum latency value per minute may be used as basis for minimum curve 1070.

Reference is now made to FIG. 11, which illustrates a graphical user interface 1110 presented on a display 1105, in accordance with some embodiments of the presently disclosed subject matter. Display 1105 is an example of output device(s) 230.

Graphical user interface 1110 include a graph 1100. Graph 1100 is a visual representation of historical, current and predicted latency values. Graphical user interface 1100 also includes selectable menus 1020, 1030A, 1030B, and 1040 discussed above with reference to FIG. 10.

In FIG. 11, the historical, current and predicted latency values are visually represented by three curves, maximum curve 1150, mean curve 1160, and minimum curve 1170. FIG. 11 shows the maximum, mean and minimum latency values(s) that were shown in FIG. 10. In addition, predicted maximum, mean and minimum latency value(s) for the next 40 minutes are also plotted.

Latency values may not necessarily be visually represented by a plurality of curves. Reference is now made to FIG. 12 which illustrates a graph 1200 of latency values plotted against time, in accordance with some embodiments of the presently disclosed subject matter.

Graph 1200 is a visual representation of historical and current latency values. Graph 1200 is presented on a display 1205. Display 1205 is an example of output device(s) 230.

FIG. 13 illustrates a graph 1300 of latency values plotted against time, in accordance with some embodiments of the presently disclosed subject matter.

Graph 1300 is a visual representation of historical, current and predicted latency values. Graph 1300 is presented on a display 1305. Display 1305 is an example of output device(s) 230.

FIG. 13 shows the latency values plotted in FIG. 12. In addition, predicted latency values are also plotted. For example, the latency value at time t+5 may be predicted, e.g. based on twenty historical and current latency values from time minus 20 to time 0, as shown in FIGS. 12 and 13.

Figure 14:
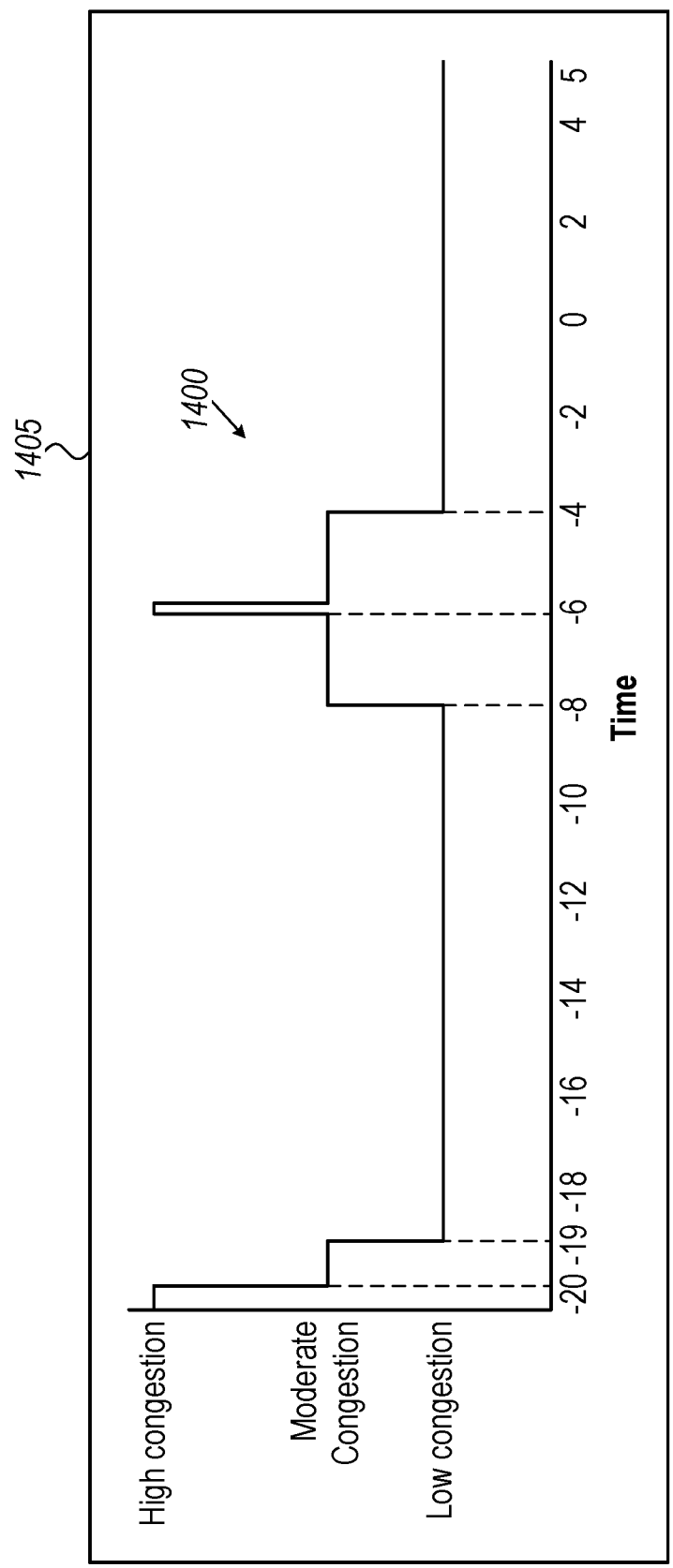
FIG. 14 illustrates a graph of congestion values plotted against time, in accordance with some embodiments of the presently disclosed subject matter.

FIG. 14 illustrates a graph 1400 of congestion values plotted against time, in accordance with some embodiments of the presently disclosed subject matter. Graph 1400 is a visual representation of historical, current and predicted congestion values. The congestion values correspond to the latency values shown in FIG. 13. Graph 1400 is presented on a display 1405. Display 1405 is an example of output device(s) 230.

To simplify the example of FIG. 14, it is assumed that a representative latency of 30 μs is computed (e.g. as per stage 310 of FIG. 3) for the entire time interval shown in FIG. 14. It is further assumed that there is a lower threshold of 10 μs and a higher threshold 20 μs. As shown in FIG. 14, when the difference between a latency value (shown in FIG. 13) and the representative latency is below 10 μs at a timepoint, then there is low congestion level at the timepoint. When the difference is at least equal to 10 μs then there is a moderate congestion level at the timepoint. When the difference is at least equal to 20 μs there is a high congestion level at the timepoint.

Figure 15:
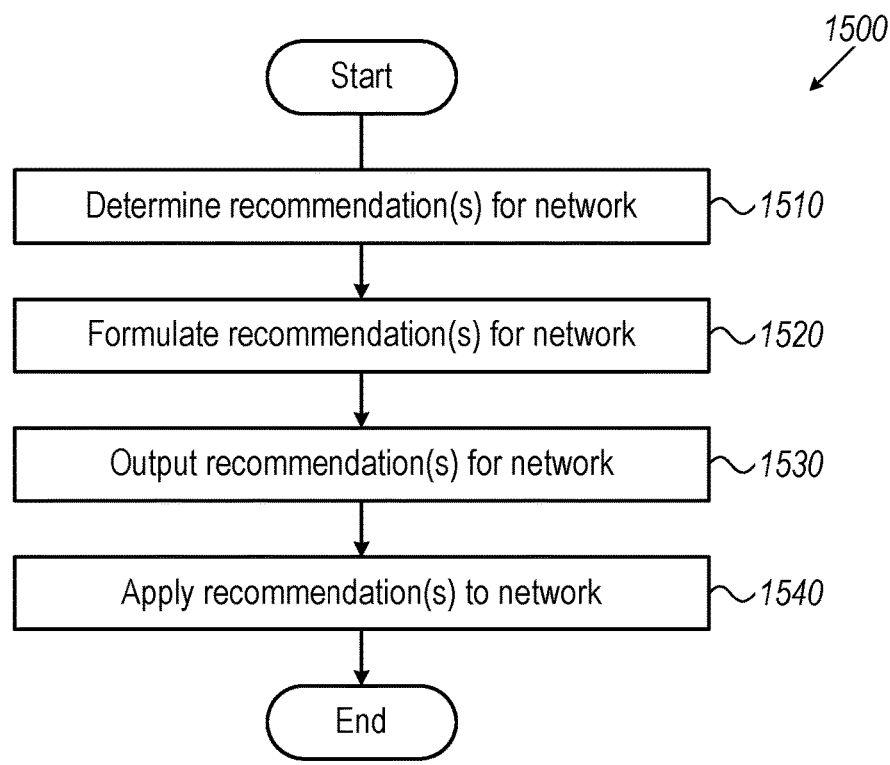
FIG. 15 is another flowchart of a method, in accordance with some embodiments of the presently disclosed subject matter.

FIG. 15 is a flowchart of a method 1500, in accordance with some embodiments of the presently disclosed subject matter.

Method 1500 may be performed, for instance, subsequent to determining that any network device 140 in network 100 has a certain congestion level (e.g. in stage 330 of FIG. 3) and/or subsequent to predicting that any network device 140 in network 100 will have a certain congestion level (e.g. in stage 930 of FIG. 9). For example, the certain congestion level may be any level above the lowest congestion level, or may be the highest congestion level. Additionally or alternatively, method 1500 may be performed periodically, episodically, and/or consequent to one or more events such as upon specification of a user.

In stage 1510, device manager 190 determines one or more recommendations for network 100. Device manager 190 may recommend, for instance, commitments regarding congestion and latency for network 100; maintenance, repair, replacement and/or upgrade of network device(s) 140 and/or endpoint(s) 130 in network 100; provisioning of additional network device(s) and/or endpoint(s) to network 100, design improvement to (or in other words redesign of) network device(s) 140 and/or endpoint(s) 130 in network 100; reconfiguration (e.g. rerouting, changing access control lists and/or quality of service policies) in network 100; adjustment of application(s); and/or any other solutions such as solutions based on detected and diagnosed problems (e.g. bottlenecks, other performance issue(s)) in network 100.

For example, it is assumed that a current or predicted congestion level is above the lowest congestion level (e.g. moderate congestion or high congestion) for a first network device 140 in network 100 (e.g. switch 144). Current or predicted congestion level(s) of a second network device 140 in network 100 (e.g. switch 146) include the lowest congestion level(s). Device manager 190 may in such an example recommend rerouting via the second network device 140, if possible, and/or any other type of reconfiguration of network 100 in an attempt to lessen the current congestion level of first network device 140 and/or prevent the predicted congestion level from being realized for first network device 140. Additionally or alternatively, device manager 190 may recommend an upgrade to first network device 140 in an attempt to lessen the current congestion level and/or prevent the predicted congestion level from being realized. Additionally or alternatively, device manager 190 may recommend provisioning of additional network device(s) to network 100 and/or provisioning of additional port(s) within existing network device(s) 140, in an attempt to lessen the current congestion level of first network device 140 and/or prevent the predicted congestion level from being realized for first network device 140. Additionally or alternatively, device manager 190 may recommend repair and/or maintenance of first network device 140, in an attempt to lessen the current congestion level and/or prevent the predicted congestion level from being realized. In such an example, all of the above mentioned solutions may be recommended, or selected solution(s) may be recommended, for instance based on other criteria such as maintenance schedules, cost, difficulty of implementation, etc. In other examples, different solutions may be recommended, in addition to or instead of the above mentioned solutions.

In stage 1520, device manager 190 (e.g. indication module 226 of example device manager 200) formulates the recommendation(s) determined in stage 1510 or a part thereof. For example, device manager 190 may formulate recommendation(s) in any appropriate format(s) that may be used by output device(s) (e.g. output device(s) 230 of example device manager 200) in order to output the recommendation(s). In stage 1530 device manager 190 (e.g. output device(s) 230) output(s) the recommendation(s) that were formulated or a part thereof.

In cases where method 1500 is performed due to a determination in stage 330 of FIG. 3 that network device 140 has a certain congestion level, the generation of an indication in stage 340 may include the formulation in stage 1520 of recommendation(s), at least some of which are outputted on output device(s) in stage 1530. In such case(s), the formulation of recommendation(s) may be intrinsically indicative of the network device 140 having the certain congestion level.

In stage 1540, device manager 190 may apply the recommendation(s) that were determined in stage 1510, or a part thereof, to network 100 and/or may cause a system external to device manager 190 to apply the recommendation(s), or a part thereof, to network 100. For example, a software update may be provided to a given network device 140 in network 100 that is experiencing current highest level of congestion or having predicted highest level of congestion. As another example, network 100 may be reconfigured.

In some embodiments, both stages 1520/1530 and stage 1540 are performed for a particular recommendation. For example, once a user has approved a recommendation to be applied by device manager 190 or by an external system, device manager 190 or the external system may apply the recommendation. Such an example may be considered to be a semi-autonomous application of the recommendation. Additionally or alternatively for a particular recommendation, either stage 1520/1530 may be performed or stage 1540 may be performed. If stage 1540 is performed without pre-approval of a user, the performance of stage 1540 may be considered to be an autonomous application of the recommendation. Autonomous or semi-autonomous application of one or more recommendations may in some cases be advantageous. It is also possible that a particular recommendation may be formulated and outputted in stages 1520/1530 for information purposes, as well as being applied autonomously in stage 1540.

In some embodiments, device manager 190 and/or the external system may analyze the effect on network 100 of any recommendations applied by device manager 190 or the external system, and/or the effect on network 100 of any outputted recommendation which led to action(s) by a user. The analysis may be part of machine learning implemented by device manager 190 and/or the external system. For instance, the machine learning may enable device manager 190 to determine better recommendations for network 100 in subsequent iterations of stage 1510.

In addition to or instead of recommendations for network 100 (for which it is assumed that timing data was received by device manager 190), recommendation(s) may be determined, formulated, outputted and/or applied in any of stages 1510 to 1540 that are not necessarily related to network 100. For example, recommendation(s) may include recommendation(s) for other network(s) such as recommendation(s) for design of next generation network device(s) and/or endpoint(s) to be used in the other network(s), and/or recommendations for configuration of the other network(s). Additionally or alternatively, machine learning which includes analysis of the effect of recommendations on network 100 may be used to determine recommendation(s) for the other network(s).

In some embodiments, method 1500 may include fewer, more and/or different stages than illustrated in FIG. 15. For example, either stages 1520 and 1530 or stage 1540 may be omitted in some embodiments. Additionally or alternatively, in some embodiments, stages in method 1500 (e.g. 1520/1530 and 1540) that are described with reference to FIG. 15 as being performed sequentially and in a certain order, may be performed in a different order and/or simultaneously.

In some embodiments, output of an indication, such as any of the visual representations discussed with reference to FIGS. 4A, 5, 6, 7, 8, 10, 11, 12, 13 and/or 14 may allow a user to perform actions regarding network 100 and/or other networks. Additionally or alternatively, in some embodiments the output of recommendations in stage 1530 (whether or not intrinsically indicative of congestion) may allow a user to perform actions regarding network 100 and/or other networks.

For example, a user associated with a service provider may specify commitments relating to latency and congestion, for instance as part of an SLA. As another example, a user associated with network administration may detect the effect of various access control lists (ACLs), quality of service policies, etc. on the performance of network 100 (e.g. in terms of congestion, latency). As another example, the latency value(s), congestion level(s), etc., as discussed herein, may allow a user associated with network administration to provision network 100 and/or other networks for better efficiency. As another example, the predictions (e.g. of congestion value(s), latency level(s), etc.) may allow a user associated with network administration to plan equipment (e.g. network devices, endpoints) upgrades and/or replacement before the equipment stalls production or causes another problem. As another example, the latency value(s), congestion level(s), etc., as discussed herein, (e.g. when relating to many customers of a design and manufacture company) may allow a user associated with design and manufacture in designing next generation network devices; and/or in creation of tools (e.g. device manager 190 or otherwise) that use machine learning, for instance, to autonomously configure and/or reconfigure network 100 and/or other networks. Continuing with describing such an example, the latency value(s), congestion level(s), etc., as discussed herein, may be used to predict future performance requirements for network devices. The performance requirements when pooled from a plurality of customers may be used to design next generation devices that meet or exceed the performance requirements. For instance, in such an example, it is assumed that the representative latency of a given network device 140 in network 100 may have grown from 10 µs to 40 µs over the last four months and is forecasted to exceed 40 µs by mid-next year, so that the given network device 140 will no longer meet performance requirements of network 100 after mid-next year. The latency value(s), congestion level(s), etc., as discussed herein, may assist in designing next generation network devices that will meet or exceed the future performance requirements. As another example, the latency value(s), congestion level(s), etc., as discussed herein, for a flow (relating to a particular application) may allow a user associated with a given endpoint 130 in network 100 to detect where packets are getting delayed, and may assist such a user in developing diagnostic capabilities in applications. The latency value(s), congestion level(s), etc., as discussed herein, for a flow (relating to a particular application) may allow a user associated with the given endpoint 130 or with endpoint(s) in other network(s) to additionally or alternatively adjust applications in order to adapt application parameters dynamically to network conditions. For instance, a device providing streaming video service for plant monitoring may have encoding parameters adjusted in order to adapt to the network conditions. Other actions and/or advantages may be apparent from the disclosure.

The visual representations illustrated in FIGS. 4A, 5, 6, 7, 8, 10, 11, 12, 13 and/or 14 were provided for illustration purposes and in other embodiments, other visual representations which look differently than the illustrated visual representations may be additionally or alternatively generated and presented.

As those in the art will appreciate, the format of the timing data that is sent to device manager 190 (e.g. via management plane 180—FIG. 1) may vary depending on the embodiment. In some embodiments the format may include a key value pair. For example, when the timing data that is sent by a given network device 140 in network 100 (e.g. switch 144) includes a latency value computed by the given network device 140 for a packet which passed through the given network device 140, the key may include {LocalTime, DeviceId, InterfaceId(s), FlowParams, VQId, Type, Sub-Type, Reserved} and the value may include {latency value, OptionalTLVs}. Optionally, in this example, such pairs are aggregated using a data model such as the YANG data model, by the given network device 140 prior to being sent by the given network device 140 to device manager 190.

In this example, the LocalTime field may include the time (e.g. date and time of day) when the packet was processed and the latency value for the packet was calculated (e.g. by network device 140). The DeviceId field may include a unique identifier for the given network device 140, understood by device manager 190. The InterfaceId(s) field may include the identifier of the egress port through which the packet exited the given network device 140, allowing distinction between egress ports regarding congestion, latency etc. Additionally or alternatively, the InterfaceId(s) field may include the identifier of the ingress port through which the packet entered the given network device 140, allowing distinction between ingress ports regarding congestion, latency etc. The FlowParams field may include information to identify the flow to which a packet belongs, including any of the following: source IP address, destination IP address, source port, destination port, source MAC address and/or destination MAC address. Such information may allow distinction between flows regarding congestion, latency etc. The VQId field may identify the virtual queue(s) which the packet traversed. Typically although not necessarily the VQId field reflects the class of service of the packet, and allows distinction between classes of service regarding congestion, latency, etc. The type field may identify the Ethernet type of the packet, such as IPv4, allowing distinction between Ethernet types regarding congestion, latency etc. The Subtype field may include the protocol number of the packet, provided the Ethernet type was an Internet Protocol such as IPv4. Such information may allow distinction between TCP, UDP, etc. packets regarding congestion, latency, etc. The Reserved field may be reserved for future use. The latency value field may include the latency value for the packet. The Optional Time-Length-Value TLVs field may be reserved for future expansion. For instance, for a virtual LAN (VLAN) the TLV field may include the VLAN type, the number of bits and the VLAN identifier.

In other examples, the format of the timing data that is sent to device manager 190 may differ, for the given network device 140 and/or for other network devices 140 in network 100. For example, the format may exclude certain of the fields listed above, may include additional fields than listed above, may include timestamps in addition to or instead of the latency value, etc. Certain of the fields may be excluded, for instance, if the differentiation allowed by the fields with respect to congestion or latency is not needed nor desired.

Figure 16:
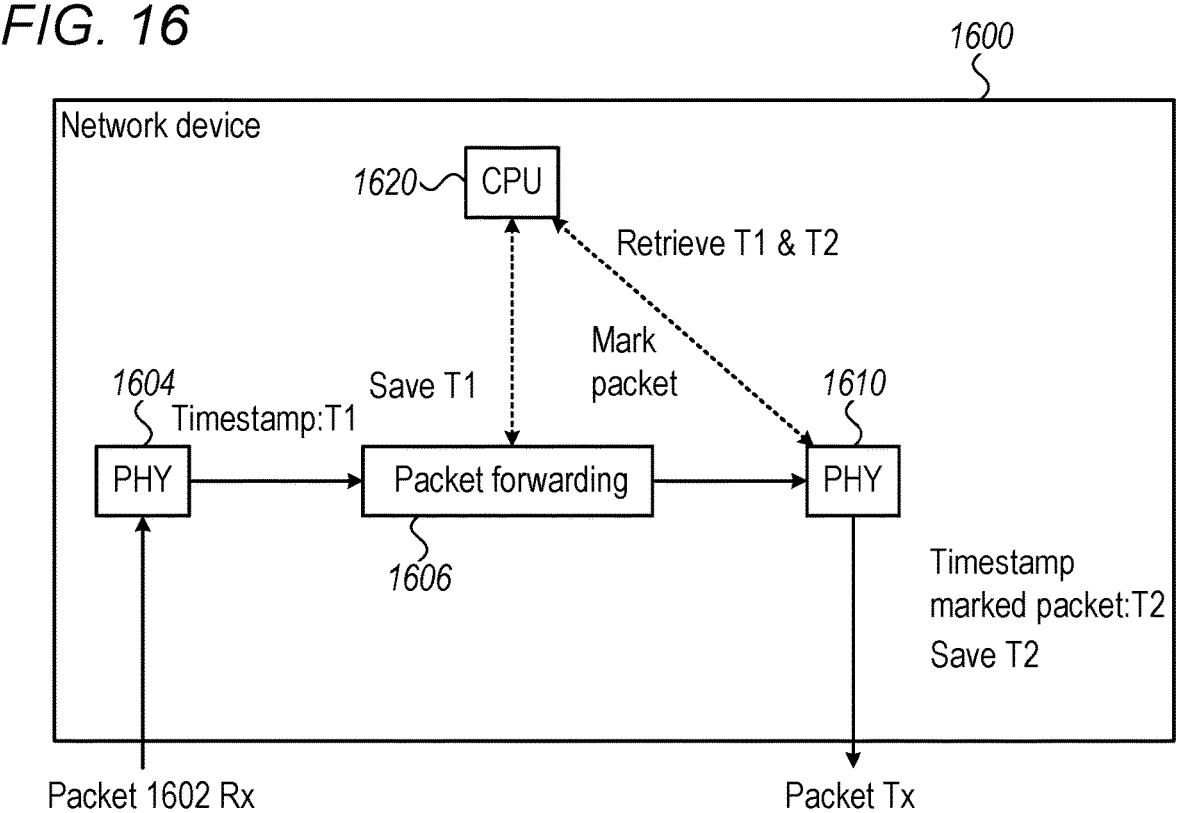
FIG. 16 is a block diagram of a network device, in accordance with some embodiments of the presently disclosed subject matter.

FIG. 16 is a block diagram of a network device 1600, in accordance with some embodiments of the presently disclosed subject matter. Network device 1600 is an example of any one network device 140 of FIG. 1.

As illustrated in FIG. 16, an ingress PHY (physical layer) 1604 on the ingress port generates an ingress timestamp for a packet 1602 that is received. The ingress timestamp may be inserted, for instance, in the internal frame header of the packet. If timing data is not to be sent by network device 1600 for all packets that pass through network device 1600, then depending on the embodiment, PHY 1604 may in any event timestamp all packets, or may only timestamp packets for which timing data will be sent by network device 1600. It is assumed in the remainder of the description that all packets are timestamped by PHY 1604.

Packet forwarding logic 1606 of network device 1600, identifies packet 1602 as being a packet for which timing data is to be sent by network device 1600. Therefore, packet forwarding logic 1606 stores the ingress timestamp, "T1" in a cache to be retrieved later by a processor (e.g. central processing unit-CPU) 1620. Provided packet 1602 has not yet been marked with a timing enabled bit, packet forwarding logic 1606 also sets a timing enabled bit, e.g. in the internal frame header of packet 1602.

If instead packet 1602 is identified as not being a packet for which timing data is to be sent by network device 1600, then packet forwarding logic 1606 discards the ingress timestamp and processes the packet conventionally.

An egress PHY 1610 on the egress port, upon detecting the timing enabled bit, generates an egress timestamp "T2" for packet 1602 and caches the egress timestamp.

Processor 1620 subsequently retrieves both ingress and egress timestamps T1 and T2 and calculates a latency value for the packet between ingress to network device 1600 and egress from network device 1600 equal to "T2 minus T1". The retrieval of the timestamps may occur before or after the packet is transmitted out by network device 1600. For example, the retrieval and calculation may be performed in anticipation of sending the timing data (e.g. in the format described in the example above, optionally aggregated with timing data including other latency values) to device manager 190. Additionally or alternatively, the actual ingress and egress timestamps T1 and T2 may be sent, and the latency value between ingress to network device 1600 and egress from network device 1600 may be calculated as T2 minus T1 at device manager 190. For example, in order to send timestamps instead of a latency value, the format described above or any other appropriate format may be modified in that the "value" field (e.g. in the key-value pair) may include the timestamps rather than the latency value. In such an example, the Localtime field or a similar field is optionally omitted as the included timestamps may be sufficiently indicative of the date and time of day that the packet was processed.

In other examples, any one network device 140 of network 100 may have a different configuration than example configuration 1600. For example the configuration may not necessarily be the same if latency values are not necessarily calculated based on ingress and egress timestamps generated by ingress and egress PHYs as discussed with reference to FIG. 16.

Figure 17:
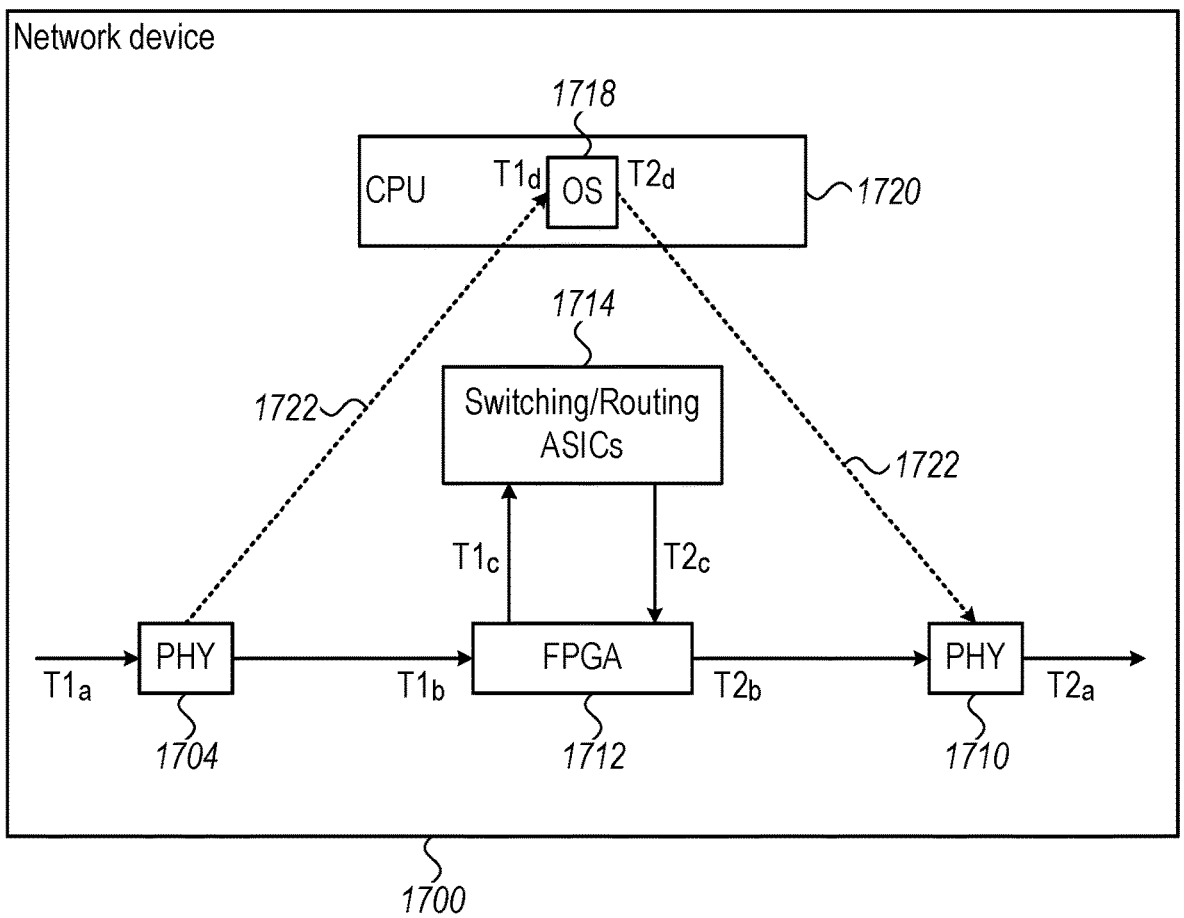
FIG. 17 is another block diagram of a network device, in accordance with some embodiments of the presently disclosed subject matter.

Refer to FIG. 17 which is a block diagram of a network device 1700, in accordance with some embodiments of the presently disclosed subject matter. Network device 1600 is an example of network device 140 of FIG. 1.

In FIG. 17, packet forwarding logic 1606 (FIG. 16) is replaced by a field programmable gate array ("FPGA") 1712 and switch/routing application specific integrated circuit(s) ("ASIC(s)") 1714. CPU 1720 is shown including an operating system ("OS") 1718.

In network device 1700, ingress and egress timestamps $T_{1a}$ and $T_{2a}$ may be generated by ingress and egress PHYs 1704 and 1710, as discussed above with reference to ingress and egress PHYs 1604 and 1610 of FIG. 16. In such a case, the highest level of accuracy among timestamping options that will be discussed with reference to FIG. 17 may be achieved, and consequently the highest level of accuracy for latency values. The accuracy may be in the nanosecond range.

Additionally or alternatively, because network device 1700 includes FPGA 1712, ingress and egress timestamps $T_{1b}$ and $T_{2b}$ may be generated by FPGA 1712. In such a case, the PHY processing times documented by the PHY vendor may be used in order to account for delay between PHYs 1704/1710 and FPGA 1712, and thus calibrate the timestamps. Timestamping accuracy and consequently latency value accuracy in the nanosecond range may thereby be achieved.

Additionally or alternatively, the timestamping point may be in the MAC layer or in switching routing ASIC(s) 1714, generating timestamps $T_{1c}$ and $T_{2c}$. In such a case, the accuracy of the timestamps and consequently of latency values is typically although not necessarily in the range of tens of microseconds.

Additionally or alternatively, if the forwarding is done in software, the timestamping point may be in the kernel of OS 1718 (i.e. in the OS kernel) or in an application running in OS 1718. Timestamps $T_{1d}$ and $T_{2d}$ may be generated. In such a case, the accuracy of the timestamps and consequently of the latency values is typically although not necessarily in the range of 100 microseconds to a few milliseconds. Dotted lines 1722 represent the packet flow if forwarding is done in software.

Additionally or alternatively to the approaches discussed with reference to FIGS. 16 and 17, network devices 140 in network 100 (e.g. router 142, switch 144 and switch 146 of FIG. 1) may be configured to timestamp packets of messages traveling between such network devices 140, e.g. in order to determine response time. For example, a packet may be timestamped upon egress from one network device 140 (e.g. network device 142 or 144) and timestamped upon ingress to another network device 140 (e.g. network device 144 or 146) in order to determine the response time for the packet exchanged between the network devices. In some embodiments of the presently disclosed subject matter, such timestamps from network devices 140 may be used to calculate a latency value of the packet between ingress and egress of a given network device 140 (e.g. network device 144). For example, the timestamps may be sent as timing data to device manager 190 and matched up by device manager 190 in order to calculate latency values between ingress and egress of the given network device 140. Continuing with describing the example, network device 144 may send timing data that includes an egress timestamp for a packet, timestamped by network device 142 which forwarded the packet to network device 144, and includes an ingress timestamp that was timestamped by network device 144. Network device 146 may send timing data which includes an egress timestamp for the packet, timestamped by network device 144 which forwarded the packet to network device 146, and an ingress timestamp for the packet that was timestamped by network device 146. Assuming network devices 142, 144, and 146 are in sync, device manager 190 may match up the timing data and use the ingress timestamp sent by network device 144 and the egress timestamp sent by network device 146 to compute the latency value between ingress and egress for network device 144 as the difference between the egress timestamp and the ingress timestamp. For example, the timing data that is sent by network devices 144 and 146 to device manager 190 may include data which allows the matchup. Data which allows the matchup may include, for instance, one or more of the fields discussed above (e.g. DeviceId, InterfaceId(s), FlowParams, VQId, Type, SubType, etc.), and/or packet identifying data such as a hash of the packet.

Additionally or alternatively, network tapping may be performed prior to ingress to and subsequent to egress from any one network device 140 in network 100. The results of the tapping may be used by device manager 190 or by a device external to network device 140 to calculate latency values for network device 140. For example, a latency value may be calculated between ingress to a given network device 140 (e.g. switch 144) and egress from the given network device 140 for a packet that passed through the given network device 140, by subtracting the result of network tapping prior to ingress, from the result of network tapping subsequent to egress. Timing data sent subsequent to the tapping by a device external to the given network device 140 to device manager 190 may include, for instance, any of the fields discussed above, mutatis mutandis. For example, the LocalTime field may include the date and time of day the latency value was calculated by the external device. The results of the tapping may be sent in addition to or instead of the latency value.

Elements in network 100 such as any of network devices 140, endpoints 130 and/or device manager 190 may each be made up of software and/or hardware capable of performing the functionality attributed to the element in embodiments described herein or known to conventionally be performed by such an element. Similarly, modules of such elements may each be made up of software and/or hardware capable of performing the functionality attributed to the module in embodiments described herein or known to conventionally be performed by such a module. Software may include firmware, when appropriate. It is noted that functionality attributed to a particular element or to a particular module within an element in some embodiments may in some other embodiments be additionally or alternatively performed by one or more other elements and/or modules.

In some embodiments, software components of the presently disclosed subject matter may, if desired, be implemented in ROM (read only memory) form. The software components may, in some embodiments, be implemented in hardware, if desired, using conventional techniques.

It will be appreciated that the subject matter contemplates, for example, a computer program product comprising a computer readable medium having computer readable program code embodied therein for executing one or more methods disclosed herein; for executing one or more parts of method(s) disclosed herein; and/or for executing functionality of element(s) and/or module(s) disclosed herein such as functionality of any of modules 222, 224, and/or 226. Further contemplated, for example, is computer readable program code for executing method(s) disclosed herein; for executing part(s) of method(s) disclosed herein; and/or for executing functionality of element(s) and/or module(s) disclosed herein such as functionality of any of modules 222, 224, and/or 226. Further contemplated, for example, is a computer readable medium having computer readable program code embodied therein for executing method(s) disclosed herein; for executing part(s) of method(s) disclosed herein; and/or for executing functionality of element(s) and/or module(s) disclosed herein such as functionality of any of modules 222, 224, and/or 226.

In the above description of example embodiments, numerous specific details are set forth in order to provide a thorough understanding of the subject matter. However, it will be appreciated by those skilled in the art that some examples of the subject matter may be practiced without these specific details. In other instances, well-known features have not been described in detail so as not to obscure the subject matter.

It will also be appreciated that various features of the subject matter which are, for clarity, described in the contexts of separate embodiments may also be provided in combination in a single embodiment. Conversely, various features of the subject matter which are, for brevity, described in the context of a single embodiment may also be provided separately or in any suitable subcombination.

It will further be appreciated by persons skilled in the art that the presently disclosed subject matter is not limited by what has been particularly shown and described hereinabove. Rather the scope of the subject matter is defined by the appended claims and equivalents thereof:

What is claimed is:

1. A system comprising:
   memory; and
   at least one processor;
   the at least one processor at least adapted to:
   compute one or more representative latency values for a network device based on a plurality of latency values obtained for a plurality of packets which passed through the network device during a period of time, the plurality of latency values indicative of latency between ingress to the network device and egress from the network device, wherein said computation is performed by weighting one or more latency values of the plurality of latency values associated with packets which passed through the network device during a first period of time more heavily than one or more latency values of the plurality of latency values associated with packets which passed through the network device during a second period of time earlier than the first period of time;
   obtain one or more latency values for one or more packets which passed through the network device after the period of time, the one or more latency values indicative of latency between ingress to the network device and egress from the network device;
   determine one or more congestion levels per egress port of the network device or per ingress port of the network device, wherein said determination is performed by comparing at least one of the one or more representative latency values, which are obtained for the plurality of packets passing through the network device during the period of time, to at least one of the one or more latency values, which are obtained for the one or more packets passing through the network device after the period of time;
   generate an indication in accordance with said determination, the indication to be outputted on at least one output device; and
   adjust one or more parameters of an application executing on an endpoint in communication with the network device based on the one or more congestion levels.

2. The system of claim 1, wherein said generation of the indication is performed by generating at least one visual representation of at least one of the one or more congestion levels, the at least one visual representation to be presented on the at least one output device.

3. The system of claim 2, wherein said generation of the at least one visual representation is performed by generating at least one visual representation of at least one connection for the network device, the at least one visual representation of the at least one connection having one or more attributes that are selected in accordance with said determination of the one or more congestion levels.

4. The system of claim 1, wherein said generation of the indication occurs due to the one or more congestion levels including a certain congestion level.

5. The system of claim 1, wherein the plurality of packets excludes at least one of the packets which passed through the network device during the period of time.

6. The system of claim 1, wherein the at least one processor is further adapted to calculate at least one difference between the at least one obtained latency value and the at least one representative latency value, and wherein said being adapted to determine further includes being adapted to compare the at least one difference to one or more thresholds.

7. The system of claim 1, wherein the at least one processor is further adapted to:
   update at least one of the one or more representative latency values for at least one of the one or more latency values, yielding at least one updated representative latency value;
   obtain one or more other latency values for one or more other packets which passed through the network device subsequent to said one or more packets;
   determine an update of one or more updated congestion levels of the network device, including being adapted to analyze at least one of the one or more other latency values in relation to at least one of the at least one updated representative latency value; and generate, in accordance with said update, an updated indication.

8. The system of claim 1, wherein the at least one processor is adapted to compute, obtain, determine and generate for a plurality of network devices in a network, the plurality of devices including the network device.

9. The system of claim 8, wherein indications generated for the plurality of network devices includes visual representations of congestions levels determined for the plurality of network devices, said visual representations included in a visual representation of the network that is presented on the at least one output device.

10. The system of claim 1, wherein said at least one processor is further adapted to use said plurality of latency values and said obtained one or more latency values to predict future latency values, and is further adapted to determine at least one congestion level of the network device at a future timepoint: including being adapted to analyze at least one of the future latency values, the at least one future latency value associated with the future timepoint, in relation to at least one relevant representative latency value that is relevant for the future timepoint.

11. The system of claim 1, wherein said at least one processor is further adapted to compute, obtain and determine a plurality of times for the network device, and to use congestion levels determined during the plurality of times to predict future congestion values for the network device.

12. The system of claim 1, wherein the at least one processor is further adapted to determine one or more recommendations for at least one of: a network which includes the network device, or at least one other network.

13. The system of claim 1, further comprising the at least one output device adapted to output the indication.

14. A method comprising:
  computing one or more representative latency values for a network device based on a plurality of latency values obtained for a plurality of packets which passed through the network device during a period of time, the plurality of latency values indicative of latency between ingress to the network device and egress from the network device, wherein said computation is performed by weighting one or more latency values of the plurality of latency values associated with packets which passed through the network device during a first period of time more heavily than one or more latency values of the plurality of latency values associated with packets which passed through the network device during a second period of time earlier than the first period of time;

obtaining one or more latency values for one or more packets which passed through the network device after the period of time, the one or more latency values indicative of latency between ingress to the network device and egress from the network device;

determining one or more congestion levels per egress port of the network device or per ingress port of the network device, wherein said determination is performed by comparing at least one of the one or more representative latency values, which are obtained for the plurality of packets passing through the network device during the period of time, to at least one of the one or more latency values, which are obtained for the one or more packets passing through the network device after the period of time;

generating an indication in accordance with said determination, the indication to be outputted on an output device; and adjusting one or more parameters of an application executing on an endpoint in communication with the network device based on the one or more congestion levels.

* * * * *

UNITED STATES PATENT AND TRADEMARK OFFICE
CERTIFICATE OF CORRECTION

PATENT NO. : 10,819,637 B2
APPLICATION NO. : 15/672333
DATED : October 27, 2020
INVENTOR(S) : Vaibhav Modi et al.

Page 1 of 1

It is certified that error appears in the above-identified patent and that said Letters Patent is hereby corrected as shown below:

In the Specification

In Column 4, Line 21, please amend as shown:
An Internet of Things (IOT) network may include as In Column 5, Line 2, please amend as shown:
work 100 may not necessarily be an IOT network.

Signed and Sealed this
Nineteenth Day of January, 2021

Andrei Iancu
*Director of the United States Patent and Trademark Office*